US006532102B2

(12) United States Patent
Kobayashi et al.

(10) Patent No.: US 6,532,102 B2
(45) Date of Patent: Mar. 11, 2003

(54) OPTICAL AMPLIFIER

(75) Inventors: Hideki Kobayashi, Sapporo (JP);
Tsukasa Takahashi, Sapporo (JP);
Toshihiro Ohtani, Sapporo (JP);
Futoshi Izumi, Kawasaki (JP); Shota Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/891,205

(22) Filed: Jun. 26, 2001

(65) Prior Publication Data

US 2002/0114060 A1 Aug. 22, 2002

(30) Foreign Application Priority Data

Feb. 22, 2001 (JP) ......................... 2001-047315

(51) Int. Cl.[7] .................................. H01S 3/00
(52) U.S. Cl. .................. 359/334; 359/341.44
(58) Field of Search ..................... 359/334, 341.44

(56) References Cited

U.S. PATENT DOCUMENTS

| 4,401,364 | A | | 8/1983 | Mochizuki ............... 350/96.16 |
| 4,558,921 | A | | 12/1985 | Hasegawa et al. |
| 4,616,898 | A | | 10/1986 | Hicks, Jr. ................. 350/96.15 |
| 4,805,977 | A | | 2/1989 | Tamura et al. ........... 350/96.16 |
| 5,436,750 | A | | 7/1995 | Kawano |
| 5,914,794 | A | * | 6/1999 | Fee et al. .................. 359/110 |
| 6,344,915 | B1 | * | 2/2002 | Alexander et al. ......... 359/177 |
| 6,373,621 | B1 | * | 4/2002 | Large et al. ................ 359/334 |

FOREIGN PATENT DOCUMENTS

| EP | 0382243 A2 | 8/1990 |
| EP | 0812078 A2 | 12/1997 |
| GB | 2348063 A | 9/2000 |
| JP | 2000-98433 | 7/2000 |
| JP | 2000-332695 | 11/2000 |

OTHER PUBLICATIONS

GB Search and Examination Report dated Feb. 28, 2002 in Application No. GB 0116856.6.
GB Search Report dated Aug. 20, 1999 in GB 9906394.3.
EP Search Report dated Oct. 21, 1998 in EP 0812078.
EP Search Report dated Mar. 12, 1992 in EP 0382243.

* cited by examiner

Primary Examiner—Mark Hellner
(74) Attorney, Agent, or Firm—Staas & Halsey LLP

(57) ABSTRACT

An optical amplifier and an optical multiplexing transmission system using the same are disclosed. Automatic restoration of the operation becomes possible and malfunctioning of an APSD function is prevented. The optical amplifier using Raman amplification includes; a Raman excitation light source for generating Raman light; and a detection circuit for detecting a signal error in an OSC (optical supervisory channel) signal transmitted in addition to optical transmission signal. When the detection circuit detects a bit error in the OSC signal, an output power from Raman excitation light source is controlled so as not to injure the human body.

12 Claims, 20 Drawing Sheets

1

OPTICAL AMPLIFIER

FIELD OF THE INVENTION

The present invention relates to an optical amplifier in which Raman amplification is adopted and an optical multiplex transmission system using the same.

BACKGROUND OF THE INVENTION

A conventional optical transmission system having an optical amplifier is shown in FIG. 1. Repeaters 1 and 2 acting as optical repeaters are interconnected with an optical transmission line 3. In respective repeaters 1 and 2, optically multiplexed main signal light is amplified by optical amplifiers 10 and 20 to be incident into optical transmission line 3.

The main signal light passing through optical transmission line 3 is forwarded to repeater 1 and 2 to be amplified by optical amplifiers 11 and 21.

In regard to the signal transmission from repeater 1 to repeater 2, an optical supervisory channel (OSC) signal is wavelength-multiplexed or superposed with a main signal to transmit to repeater 2. In repeater 2, wavelength-multiplexed signal light input through optical transmission line 3 is amplified to the sufficient optical level to establish the communication.

A multiple of signal light is wavelength-multiplexed in optical multiplex communication, which necessitates great optical power for the transmission of the multiplexed main signals. Therefore, if a failure on optical transmission line 3 (such as disconnection of an optical connector, optical fiber cutoff, etc.) occurs, and if the optical power leaks out of optical transmission line 3 to be directly irradiated to the human body, it is possible to injure the human body.

Recent development of communication infrastructure has brought about demands for larger capacity communication to longer distance. In order to realize long distance transmission, there has been increasing amplification systems utilizing Raman effect in optical fiber transmission lines.

In FIG. 2, there is shown an example of an optical transmission system by the use of Raman amplification. Raman amplification is a method of obtaining Raman effect by irradiating excitation light (Raman light) produced by Raman excitation light source 22, 12 to the fiber transmission line. It is necessary to raise the level of Raman light to input directly into optical transmission line 3 so that sufficient Raman gain may be obtained.

Accordingly, in optical transmission line 3, optical multiplex transmission using Raman amplification requires more light power than ordinary optical multiplex communication, which may cause serious injury to the human body.

Therefore, it is necessary to adjust light output in case a failure occurs in optical fiber transmission line 3.

SUMMARY OF THE INVENTION

It is therefore an object of the present invention to provide an optical amplifier which enables to control light output in the occurrence of fiber failure, and to provide an optical multiplex transmission system using the optical amplifier.

To attain the above-mentioned object of the present invention, the optical amplifier using Raman amplification is provided with a Raman excitation light source for generating Raman light and a detection circuit for detecting an error condition of an OSC signal being transferred with an optical transmission signal. When the detection circuit detects a bit error condition, the optical amplifier controls Raman light output power depending on the state of the bit error condition.

As one aspect of the present invention, preferably there is provided a circuit in the optical amplifier for informing a downstream optical amplifier of a transmission line failure using a flag superposed on an OSC signal for indicating an OSC circuit condition when the detection circuit detects an error becoming a predetermined condition in the OSC signal.

As another aspect of the present invention, preferably an optical amplifier using Raman amplification supervises a flag indicating OSC line condition in each OSC signal received from an upper stream of a transmission line concerned and from an upper stream of a transmission line in the opposite direction.

As still another aspect of the present invention, preferably the detection circuit supervises a signal error on the OSC signal to remove the light output control against Raman excitation light source when the signal error becomes a predetermined condition.

As still further aspect of the present invention, preferably the detection circuit outputs Raman light which produces Raman gain corresponding to an OSC signal bandwidth onto the transmission line fiber when Raman light output control against the Raman excitation light source is removed. The detection circuit then awaits the restoration of the OSC line. After the OSC signal is restored to the normal operation, Raman light is output to produce Raman gain in the wavelength required for the system according to wavelength information indicated through the OSC line.

Further scopes and features of the present invention will become more apparent by the following description of the embodiments with the accompanied drawings.

DETAILED DESCRIPTION OF THE PREFERRED EMBODIMENTS

Figure 1:
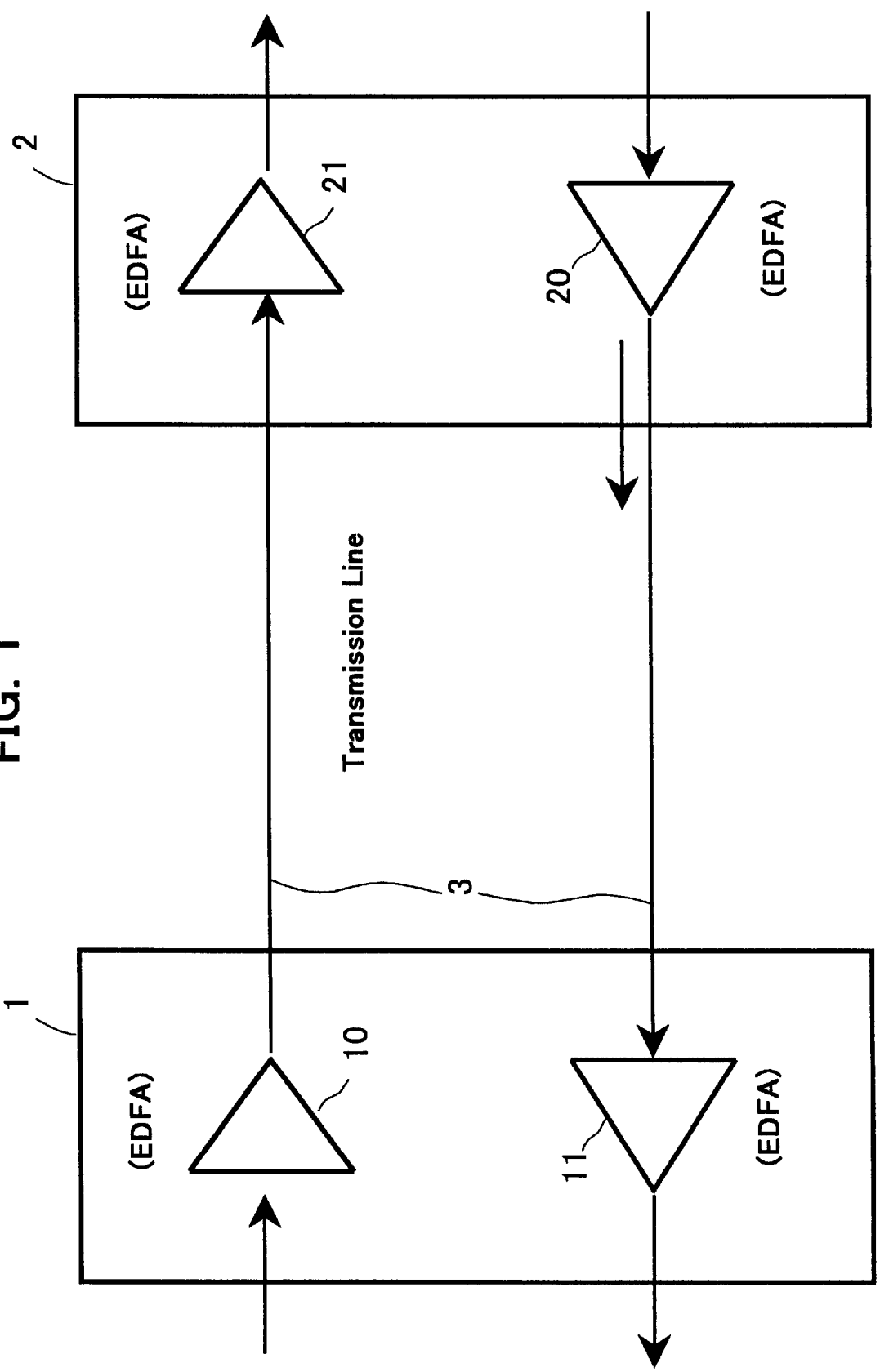
FIG. 1 shows a general configuration example of an optical multiplexing transmission system.

A control method of Raman light output in the present invention is described below.

When a transmission line failure occurs such as an input connector disconnection at an amplifier located downstream of the transmission line (an optical amplifier 21 in a repeater 2 shown in FIG. 2) or a fiber cutoff in an optical transmission line 3, a main signal break is detected in optical amplifier 21 of repeater 2.

In repeater 2, Raman light output fed from a Raman excitation light source 22 of the repeater is shut down. Moreover, main signal transmission from an optical amplifier 20 to a repeater 1 located upstream is stopped to perform a shutdown control on the equipment in repeater 1.

Another method is that light input of an optical supervisory channel (OSC) signal from repeater 1 is supervised in repeater 2. When an OSC signal break is detected, repeater 2 determines that a fiber failure occurs on optical transmission line 3. Using an OSC signal transmitted through the opposite line from repeater 2, an output control signal is transmitted from optical amplifier 20 to repeater 1 located upstream of the signal path of interest. Thus output control of optical amplifier 10 is carried out to realize an automatic light output control (APSD).

Figure 2:
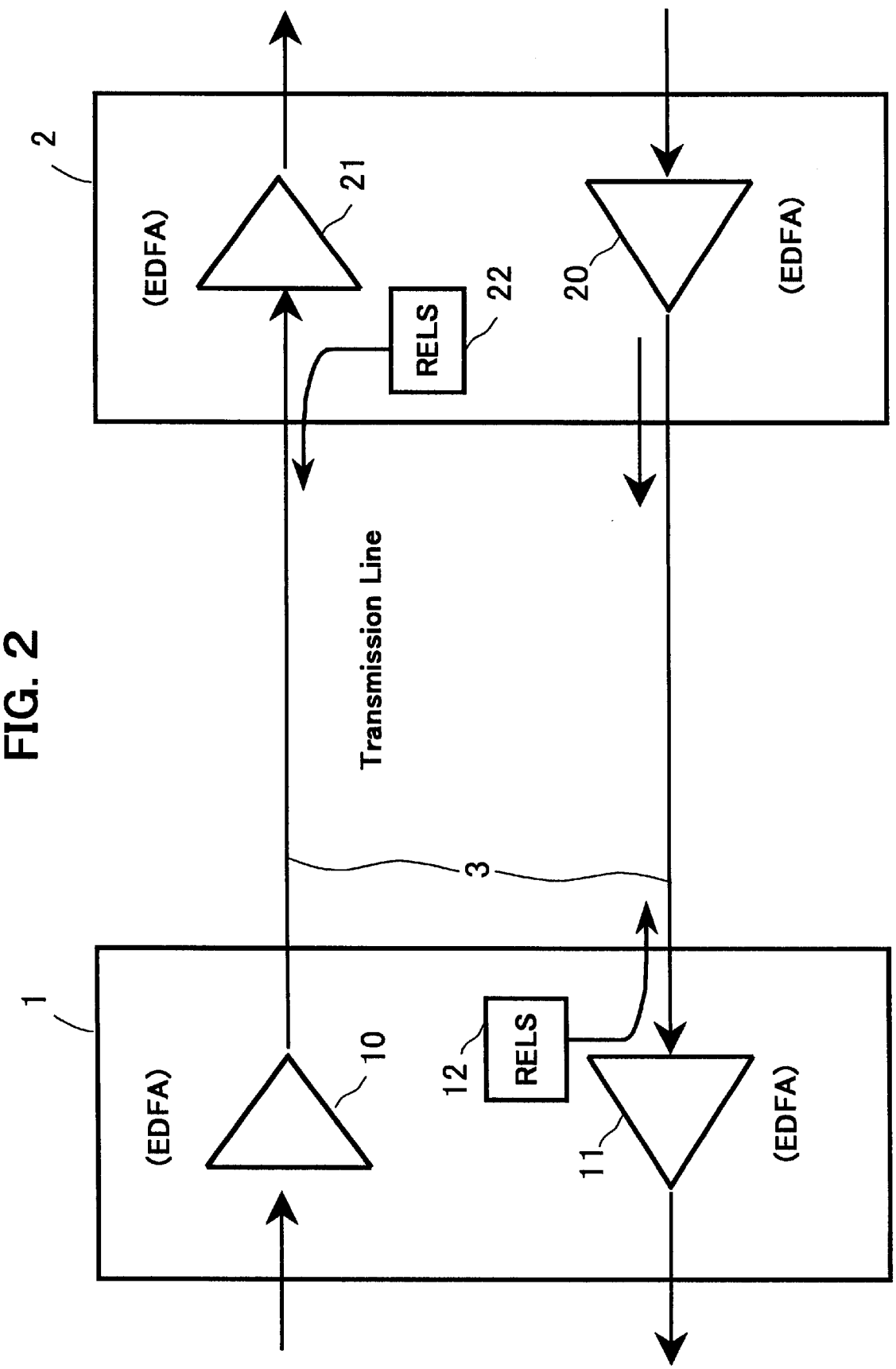
FIG. 2 shows an example of an optical transmission system using Raman amplification.

Now, the automatic light output control is explained further. In FIG. 2, receiving condition of a main signal or an OSC signal output from optical amplifier 10 in repeater 1 is supervised in optical amplifier 21 of repeater 2 located downstream. In optical amplifier 21, when a break is detected in either the main signal or the OSC signal, an APSD flag is generated by optical amplifier 21 indicating the signal break to optical amplifier 20 provided on the opposite line side.

In optical amplifier 20 on the opposite line side, an APSD flag (APSD-LB) is set into an OSC signal frame to transmit to optical amplifier 11 of repeater 1 in the remote station.

In optical amplifier 11 in the remote station, the APSD flag (APSD-LB) is supervised in the received OSC signal frame. On detecting the APSD flag in the OSC signal, the reception of APSD flag (APSD-LB) is informed to optical amplifier 10 in the repeater 1. Optical amplifier 10, when receiving the APSD flag transmitted from the downstream, either shuts down the output signal light of optical amplifier 10 or controls light output to a safe optical level.

Accordingly, normality in receiving light output from a repeater concerned can be supervised in the downstream repeater. The light output from the repeater concerned can either be shut down or controlled to a safe optical level when a transmission line failure etc. causes the downstream repeater to fail to receive a signal from the optical amplifier in the repeater concerned.

Optical amplifier 21 sets an APSD flag in an OSC signal frame to transmit, as well as controls the light output of optical amplifier 21.

Here the above-mentioned APSD flag is explained further. The APSD flag includes identification information of optical amplifier 10 located upstream of optical amplifier 21 which issues the APSD flag. With this information it can be identified on what time break of both a main signal and an OSC signal have occurred. The identification information is assigned in an OSC signal frame as shown in FIG. 3.

Figure 3:
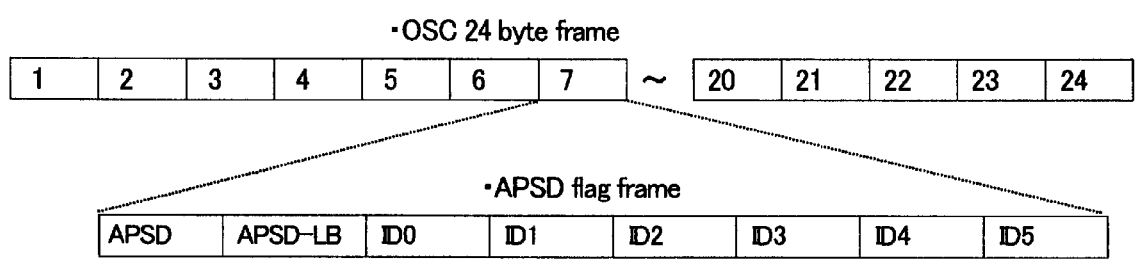
FIG. 3 shows a diagram illustrating an APSD flag.

In FIG. 3, OSC signal is a supervisory signal for equipment consisting of, for example, 24-byte frame. The OSC signal is assigned for each byte, including control signals such as wavelength information and a software control signal. In the example shown in the figure, a seventh byte is assigned for the APSD flag.

To determine an abnormal line condition occurs whether on the line concerned or on the line in the opposite direction, different bits are assigned in the APSD flag, namely an APSD bit and an APSD-LB bit. The APSD bit being set on denotes that a line abnormality occurred on the line concerned, while the APSD-LB bit on denotes line abnormal condition occurred on a line of the opposite direction. ID0–ID5 denotes equipment generating APSD.

Referring back to FIG. 2, in case a transmission line failure such as an optical signal break occurs near the upstream optical amplifier 10, reflection light reflected from the break point of the transmission line fiber is detected at repeater 1 located upstream. Thus the emission of light output having a dangerous level to the human body is prevented.

The optical transmission system using Raman amplification thus detects a signal light break when the abnormal condition such as a connector disconnection in the optical amplifier at the input side of the repeater, or a fiber cutoff occurs.

An output control against an optical amplifier and Raman light amplifier (Raman excitation light source) is carried out by transmitting an output control signal to the optical amplifier located upstream using a loop path of the transmission line provided in the opposite optical amplifier located downstream or in the repeater.

Figure 4:
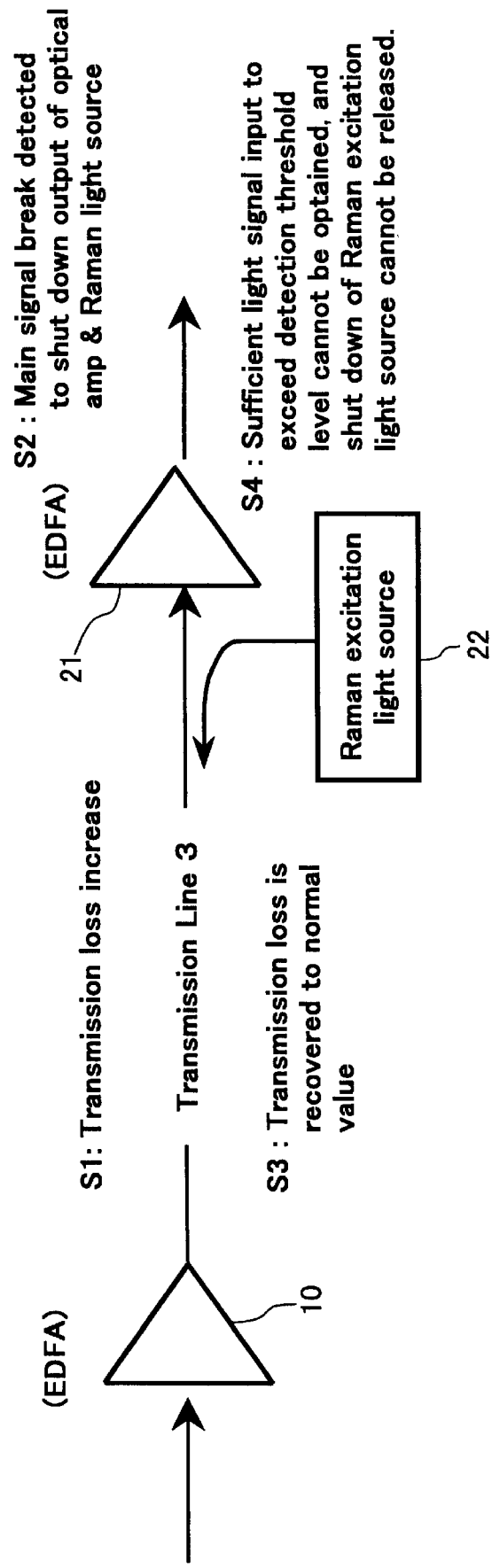
FIG. 4 shows a diagram illustrating a problem raised when light output control is carried out on the upstream side on detecting a main signal break.

In FIG. 4, there is shown a drawing illustrating a flow of output control against Raman excitation light sources 12 and 22 to perform light output control on the upstream side when a main signal break is detected on the downstream side.

In FIG. 4, optical amplifier 10 in repeater 1 and optical amplifier 21 and Raman excitation light source 22 in repeater 2 are shown in relation to FIG. 2. When a loss of transmission line 3 increases caused by a failure (step S1), a main signal break input to optical amplifier 21 is detected to shut down an output of optical amplifier 21 and Raman excitation light source 22 in repeater 2 (step S2). This causes repeater 2 to unable to receive both the main signal and the OSC signal transmitted from repeater 1.

Now, if a loss of transmission line 3 is recovered to a normal value (step S3), sufficient light signal input to exceed the detection threshold level of the light input break cannot be obtained even though optical amplifier 10 restores to transmit the main signal. Therefore the output control of shutting down output of Raman excitation light source 22 cannot be released and the automatic restoration of the system is not possible.

In addition, this method requires to maintain the OSC signal output at a certain level in order to determine the existence of transmission line failure. In such a method, it is not possible to lower a break detection threshold level below an OSC signal frame detection level.

Also, in a method for detecting an OSC signal light break, it is not possible to distinguish OSC signal light from ASS (amplified spontaneous scattering) noise caused by Raman light which is leaked into the bandwidth of the OSC signal. This may possibly produce malfunctioning of the APSD function.

In transmission equipment performing the APSD control, when a communication line in the opposite direction is shut down, a communication line concerned has to be shut down. The reason is that when the communication is stopped by a failure on the opposite line, the amplifier output control by the APSD becomes impossible if another failure occurs on the concerned repeater side. Therefore it is required to suspend the communication in both ways considering for maintaining safety to the human body.

Now, an embodiment of an optical amplifier using Raman amplification and an optical transmission system using the same to enable to automatic recovery of the system operation is described hereinafter.

In the present invention, for the output control of Raman excitation light source 22 shown in FIG. 2, level detection of OSC signal light is used instead of main signal light.

Code error in the received optical signal and frame detection are supervised in an optical reception module (O/E: opto-electric conversion module) for OSC signal communication. The APSD control for a Raman excitation light source fed to the entire system and an optical amplifier is carried out using the bit error condition which may occur during the above supervision.

Here, there are bands of S+, S, C, and L+, i.e. the separated wavelength bandwidths corresponding to the gain bandwidths of the optical amplifier (EDFA). An OSC signal is either provided for an individual band or is commonly provided for a plurality of bands depending on the bandwidth of respective optical amplifiers. As the number of bands increases with the increase of the number of channels accommodated, the number of OSC signal channels has to be increased also. This results in applying the wavelength multiplexing of the OSC signal itself.

Figure 5:
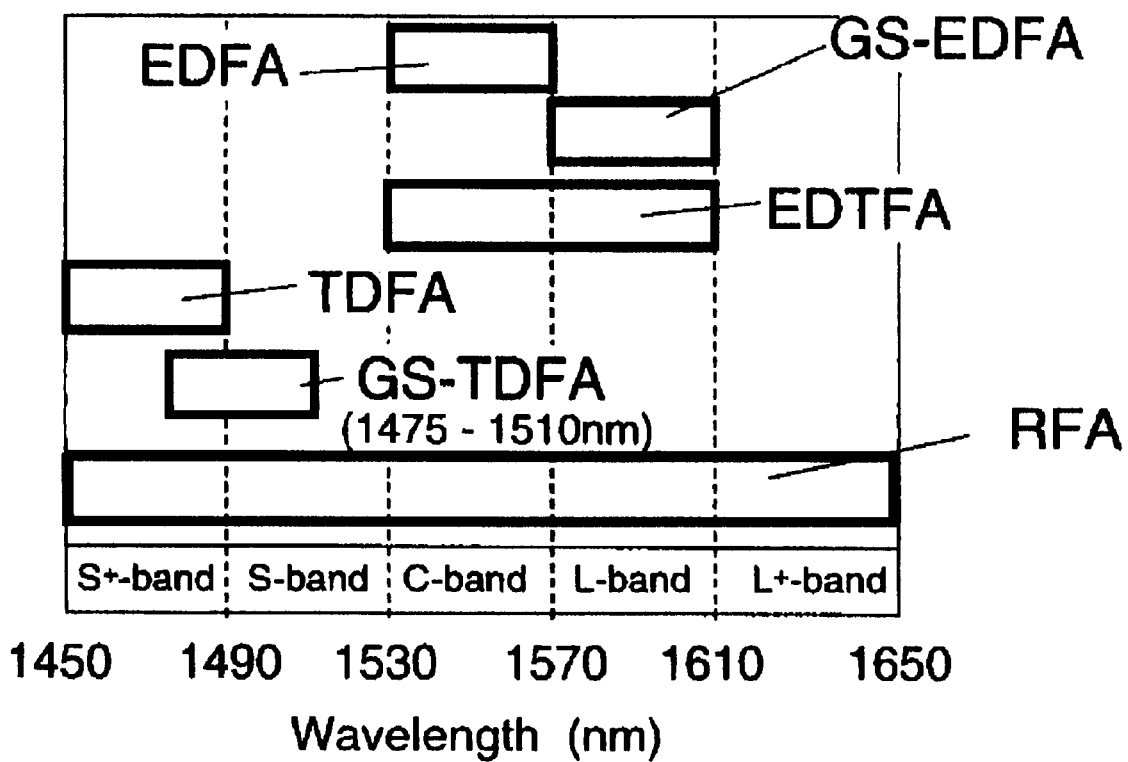
FIG. 5 shows a diagram illustrating wavelength-division bandwidths S+, S, C, L and L+, with a gain bandwidth corresponding to an optical amplifier EDFA.

In FIG. 5, EDFA(Erbium Doped Fiber Amplifier) covers 1530–1570 nm, GS-EDFA(Gain-Shifted EDFA) covers 1570–1610 nm, EDTFA(Tellurite-Based EDFA) covers 1530–1610 nm, TDFA(Thulium-Doped Fluoride-Based Fiber Amplifier) covers 1450–1490 nm and RFA(Raman Fiber Amplifier) covers 1450–1650 nm.

Figure 6:
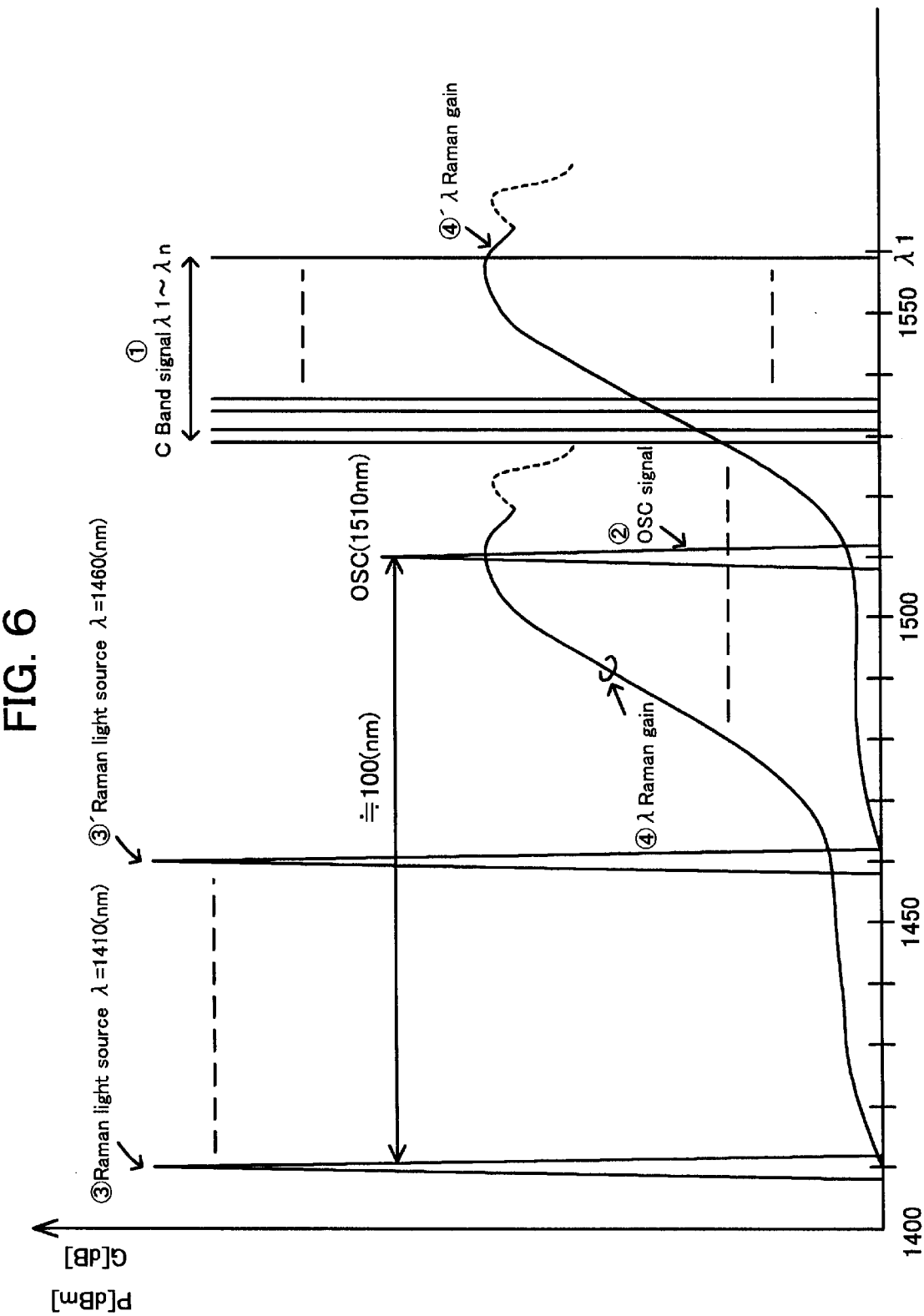
FIG. 6 shows a diagram schematically illustrating the relation between wavelength and gain in Raman amplification.

Now, an explanation on Raman amplification follows hereafter. In FIG. 6, relations between wavelengths and gains in Raman amplification is schematically illustrated.

A signal light exists in the bandwidth between 1525 nm and 1560 nm, named C band ①. On the other hand, an OSC signal ② is represented here using a typical wavelength of 1510 nm. The Raman amplification has a gain characteristic with a maximum gain at the point of longer wavelength shifted by approximately 100 nm, shown as ④ in FIG. 6.

Normally, a plurality of Raman excitation light source ③–③' are used in a Raman amplification system so as to compensate for desired wavelength gain. The Raman gain in this case exists in gain bandwidths ④–④' which are 100 nm longer than respective wavelengths $\lambda 1$ to $\lambda n$.

In the example shown in FIG. 6, because gain is required in the bandwidths between 1510 nm to 1560 nm, light sources having wavelengths of 1410 nm to 1460 nm are disposed at certain intervals for Raman light sources. (Each interval is determined so that a desired gain curve of the system may be obtained.) The sum of Raman gain for $\lambda 1$ to $\lambda n$ becomes the Raman gain for the bandwidths between 1510 nm to 1560 nm.

By disposing such a plurality of Raman excitation light sources, it becomes possible to control the gain near a specified wavelength using the light output of the incident Raman excitation light source.

As an embodiment, Raman initiation begins by emitting Raman excitation light having a wavelength of 1510 nm to a transmission line fiber when a failure is restored in the transmission line fiber, that is, an OSC signal is in the state between an occurrence of error and an occurrence of loss of frame (LOF). This Raman excitation light amplifies the OSC signal light to output optical power so that a gain of an optical level within a dynamic range can be obtained in an OSC reception module.

Thus an OSC signal reception is restored normally to proceed to a normal initiation procedure. In the initiation procedure, Raman excitation light fiber having an optical signal gain is fed to the transmission line, resulting in restoring to a normal signal reception level.

Figure 7:
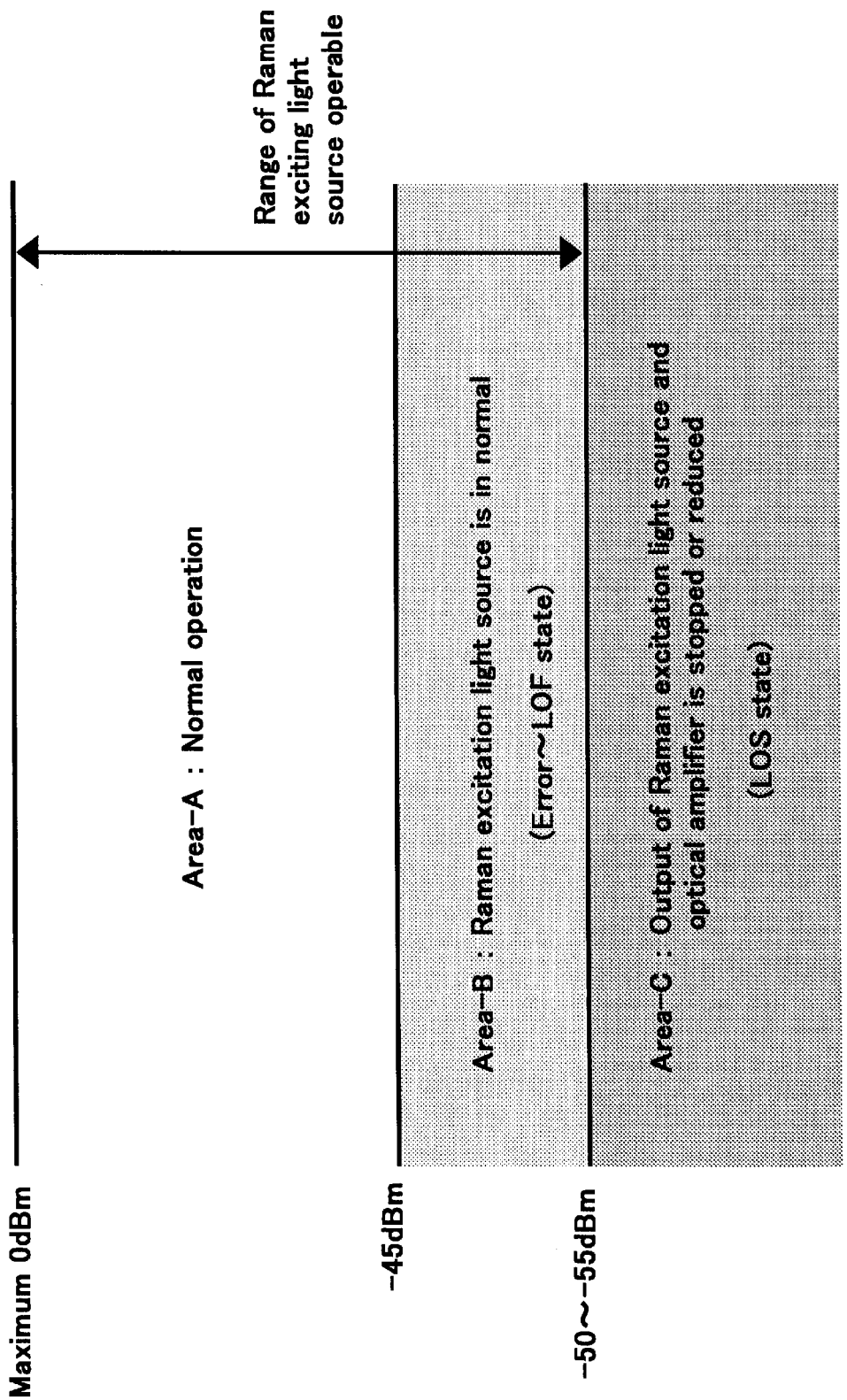
FIG. 7 shows a diagram illustrating control states against light levels received in an opto-electric conversion module.

In FIG. 7, a control state against a light reception level in an opto-electric conversion module is shown. In this figure, an area-A belongs in a dynamic range of the opto-electric conversion module and therefore generates no error.

On the other hand, an area-B belongs in the state in which data error is generated, i.e. in the state of LOF (loss of frame). In this state synchronization cannot be conducted while clock can be regenerated, resulting in an inaccurate signal recognition and therefore an error may arise. Area-C is a range in which light input cannot be recognized.

According to the present invention, the system is controlled in a following manner in each above-mentioned state.

Area-A: the system is in normal operation (The Raman excitation light source and the optical amplifier are both operating.)

Area-B: The Raman excitation light source is in normal operation, while the optical amplifier is under control in which the output is stopped or reduced.

Area-C: Output of both Raman excitation light source and the optical amplifier is stopped or reduced.

Accordingly, the state becomes into area-C when either a connector disconnection or optical fiber cutoff occurs, producing output of both Raman excitation light source and the optical amplifier is stopped or reduced. Thus light irradiation which may otherwise injure to the human body can be avoided.

Figure 8:
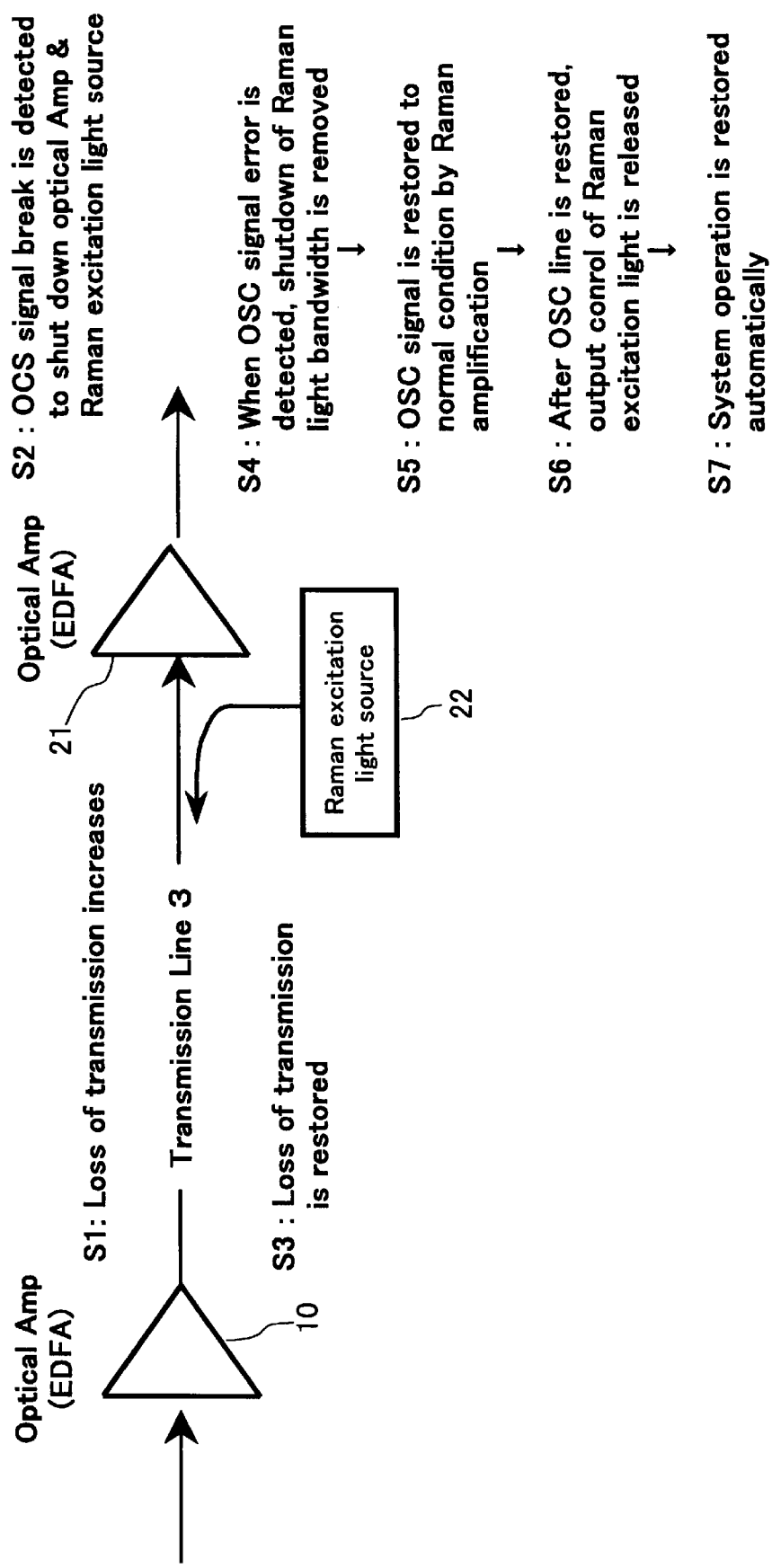
FIG. 8 shows a diagram illustrating shutdown of Raman excitation light source caused by an OSC signal break.

In FIG. 8, there is illustrated a shutdown flow of Raman excitation light source produced by OSC signal break. In the cases a connector disconnection (release) or cutoff of optical fiber occur, the loss in transmission line 3 increases (step S1). Then the OSC signal break is detected by an opto-electric conversion module provided in the front stage side of optical amplifier 21 to shut down optical amplifier 21 and Raman excitation light source 22 (step S2).

Now, when the connector disconnection or the fiber cutoff is restored, that is, loss of transmission is recovered(step S3), an OSC signal is restored and input into the opto-electric conversion module. At this time, however, because the output control of Raman excitation light source 22 is not removed, the state remains in area-B.

Then, on the optical amplifier 21 side, when an OSC signal error or frame error is detected, the shutdown of Raman light bandwidth in the OSC signal bandwidth is removed (step S4). Namely, the output of Raman excitation light source 22 is controlled so that Raman light output corresponding to the OSC signal bandwidth (i.e. ③ in FIG. 6) is restored.

Accordingly, the Raman light is output from Raman excitation light source 22 to transmission line 3, resulting in restoring the OSC signal into area-A by Raman amplification in the OSC bandwidth up to the level of a normal condition. Thus the OSC line is restored (step S5).

After the OSC line is restored, the output control of the Raman excitation light from Raman excitation light source 22 is released in the bandwidth of the optical amplifier gain, according to signal wavelength information (WCS) and wavelength fault information (WCF) included in the OSC signal (step S6). Thus the system operation is restored automatically(step S7).

As well as the APSD function described above, the present invention provides the system with a reflection detection function of the light output. By means of this detection function, the reflected light detection enables to control light output when communication in the opposite direction is suspended caused by a failure on the opposite line. This enables to continue a normal operation of the line concerned. Namely, with this function, the communication stoppage on both directions caused by a line failure in one direction can be avoided.

Figure 9:
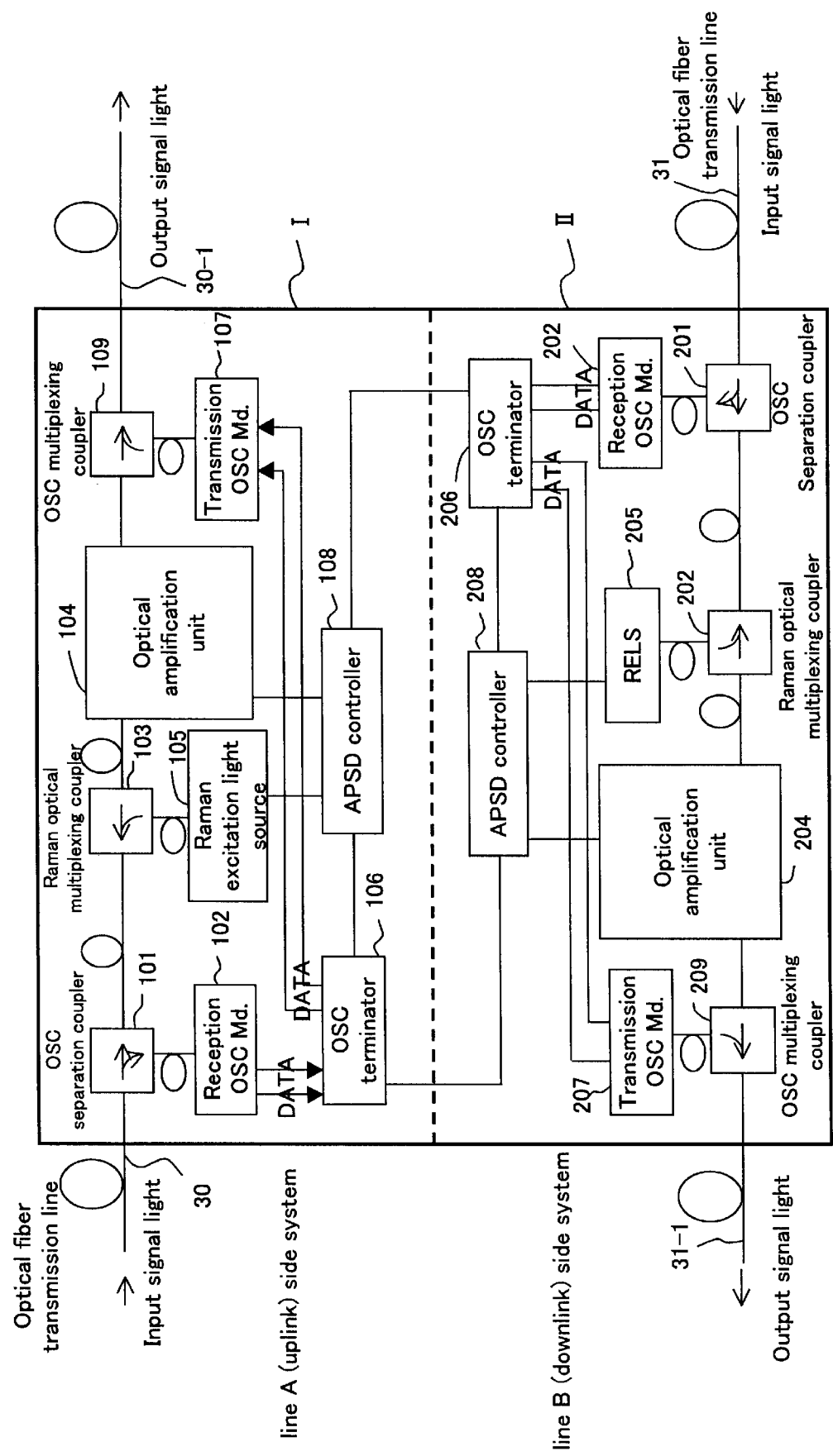
FIG. 9 shows a block diagram of an optical multiplexing transmission equipment in accordance with the present invention.

In FIG. 9, there is shown an example of the block configuration of an optical repeater according to the present invention.

In this figure, the optical repeater is constituted by a pair of units; one system I on the line A (uplink) side, and another system II on the line B (downlink) side.

A plurality of optical repeaters (not shown in FIG. 9) are interconnected by transmission line optical fibers 30 and 31. Each repeater consists of the identical configuration to that shown in FIG. 9. The length of optical fiber transmission lines 30 and 31 currently used for interconnecting adjacent optical repeaters ranges approximately from 100 to 200 and tens of kilometers.

Signal light is input to OSC separation couplers 101 and 201, in which signal component having OSC bandwidth is separated to pass to OSC reception modules 102 and 202 as an OSC signal.

OSC reception modules 102 and 202 convert the OSC signal of light signal into corresponding electric signal, to output a data signal, DATA, and a clock signal, CLK.

Outputs of OSC reception modules 102 and 202 is input to optical amplification units 104 and 204 respectively through Raman optical multiplexing couplers 103 and 203.

Raman optical multiplexing couplers 103 and 203 superpose Raman light generated by Raman excitation light sources 105 and 205 for Raman amplification to forward to optical fiber transmission lines 30 and 31 for backward excitation.

Optical amplification units 104 and 204 amplify light signals to the desired power for the system, respectively output to downstream transmission lines 30-1 and 31-1.

OSC terminators 106 and 206, after processing received OSC signal data, DATA, generate OSC signals to output for OSC transmission modules 107 and 207.

When a code error is detected in the OSC signal, an APSD flag is generated in the OSC signal to output as APSD information to an APSD controller 108 (208) located on the side concerned, an APSD controller 208 (108) located on the opposite side, and an OSC terminator 206 (106) located on the opposite side.

Moreover, an APSD condition on the opposite line from the opposite OSC terminator is supervised to transmit using an OSC signal in the downstream direction of the line concerned. This APSD flag consists of signals indicating an occurrence of an OSC code error, an OSC signal break condition and an identifier of the repeater generating the APSD signal.

APSD controllers 108 and 208 supervise APSD flags on the line concerned and the opposite line, to control the outputs of Raman excitation light sources for amplification 105 and 205, optical amplification units 104 and 204 in accordance with the APSD flag condition.

OSC transmission modules 107 and 207 performs opto-electric conversion onto the OSD signal generated in an OSC controller 106, to output an OSC light signal.

OSC multiplexing couplers 109 and 209 multiplexes OSC signal light with main signal light output from optical amplification units 104 and 204, to output in the downstream direction through transmission line optical fibers 30-1 and 31-1.

Now, an operation in each state of optical repeaters shown in the above FIG. 9 is described hereafter.

[Operation in Case of Optical Fiber Failure]

Figure 10:
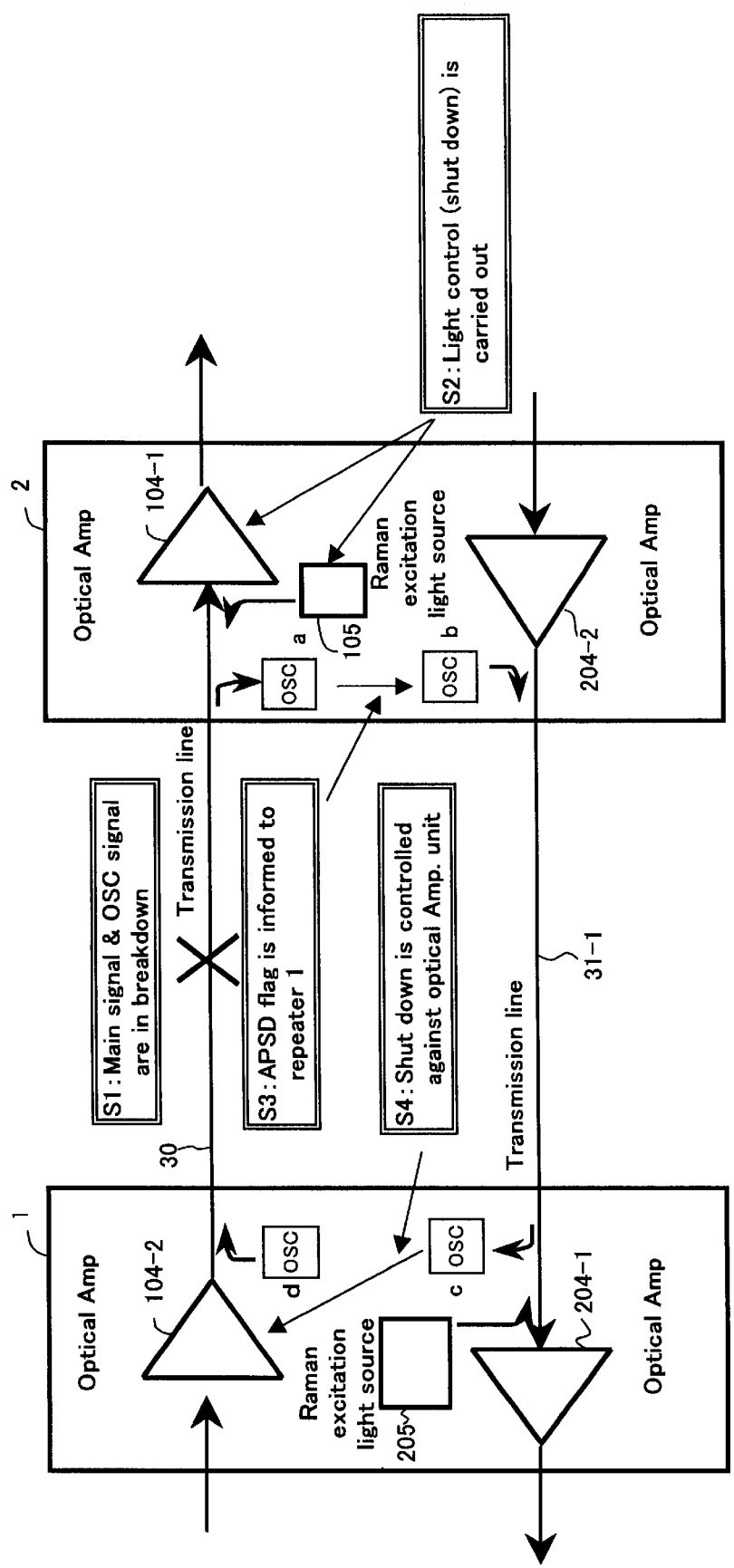
FIG. 10 shows a schematic diagram illustrating an APSD control in the event of a failure in an optical transmission fiber.

In FIG. 10, there is shown a schematic diagram illustrating the APSD control in the event of a failure in a transmission line optical fiber. In this figure, the optical repeater shown in FIG. 9 is used as repeater 1 or repeater 2 to configure a pair of repeaters mutually interconnected. In this figure, only parts necessary for explanation are briefly illustrated among functional blocks shown in FIG. 9.

Repeater 1 and repeater 2 located between transmission lines are respectively constituted by optical amplification units 104-1, 204-1, 104-2 and 204-2 and Raman excitation light sources 105 and 205.

In the event that an optical connector disconnection or optical fiber cutoff occurs on transmission line 30, repeater 1 detects the reflection light from optical fiber transmission line 30 on the optical amplification unit 104-1 side. Then repeater 1 controls output light from optical amplification unit 104-2 to reduce light down to the level not to produce injury to the human body.

It must be avoided that Raman excitation light fed from Raman excitation light source 105 in repeater 2 located on the downstream side be misidentified with the reflected light of the output from repeater 1. For this purpose Raman excitation light bandwidths have to be separated. On the repeater 2 side, both main signal and supervisory (OSC) signal are in break condition (step S1).

OSC portions 'a' 'b', 'c' and 'd' shown in FIG. 10 are constituted by OSC reception modules 102 and 202, OSc terminators 106 and 206 and APSD controllers 108 and 208, of which function includes to set an APSD flag when OSc signal light cutoff is detected.

In OSC portion 'a' in repeater 2, based on this APSD flag, light control (i.e. shutdown) is carried out against Raman excitation light source 105 and optical amplification unit 104-1 in repeater 2 (step S2).

Then, using the opposite line 31-1, APSD flag representing the detection of OSC signal break by repeater 2 is informed to repeater 1 (step S3), to control shutdown against optical amplification unit 104-2 in repeater 1 (step S4). Here, the OSC signal is transmitted similar to the normal operation case so that the restoration from the transmission line failure may be initiated from the repeater 1 side.

[Operation at the Time of Restoration After the Optical Fiber Failure]

Figure 11:
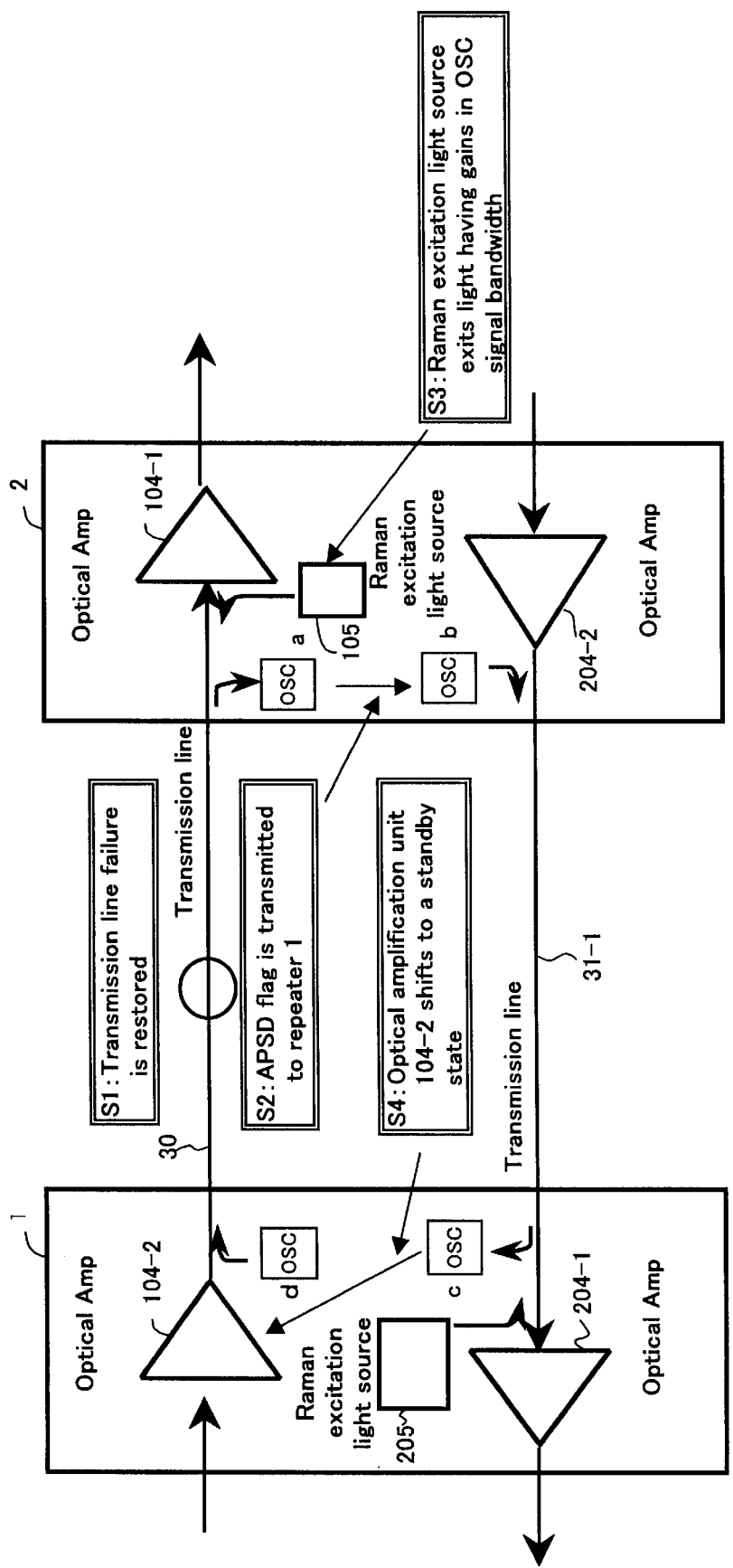
FIG. 11 shows a diagram (1) illustrating a control operation carried out when a connector disconnection or fiber cutoff is restored.
Figure 12:
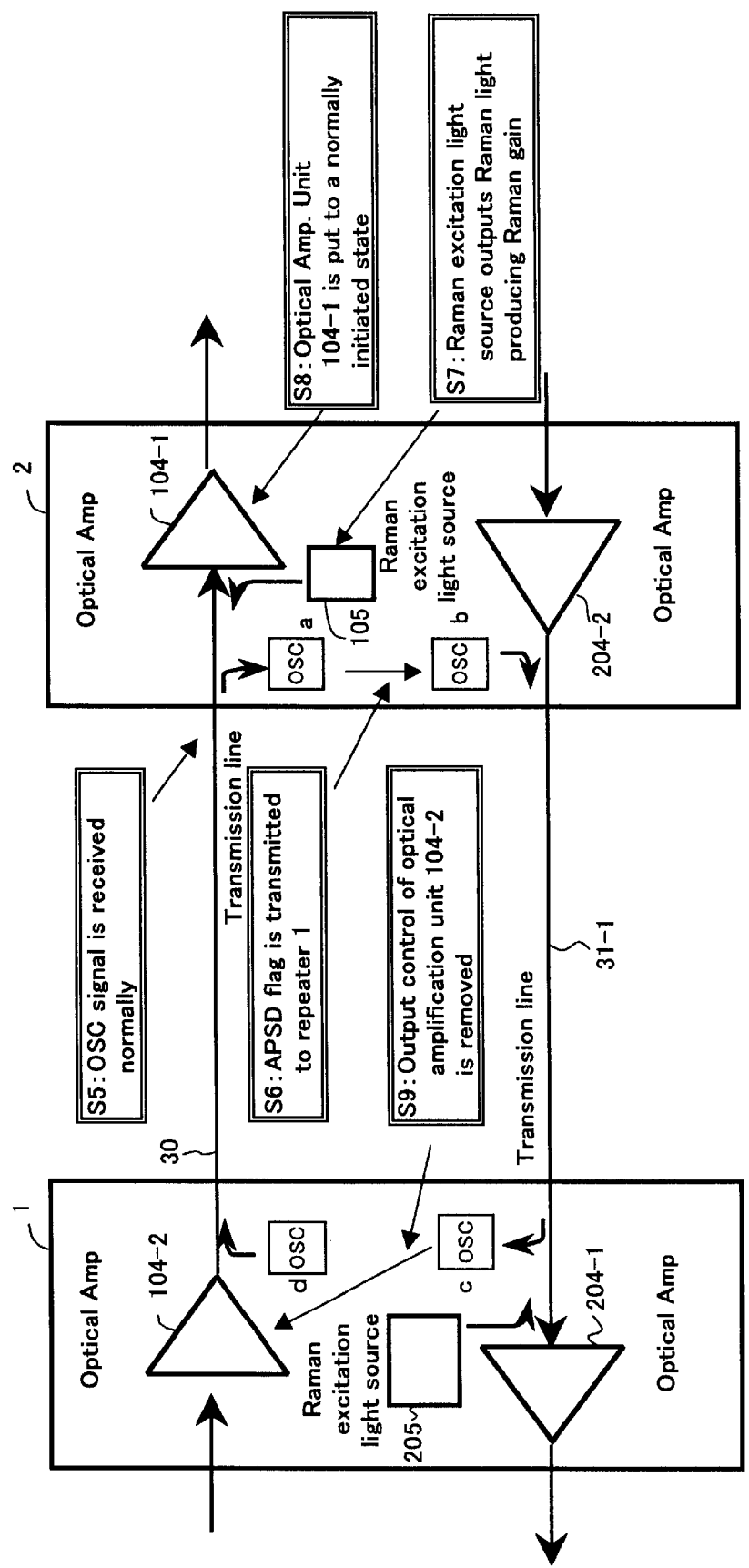
FIG. 12 shows a diagram (2) illustrating a control operation carried out when a connector disconnection or fiber cutoff is restored.

In FIGS. 11 and 12, there are shown a control operation when the connector disconnection or fiber cutoff is restored in transmission line 30. In these figures, an optical repeater shown in FIG. 9 is applied for repeater 1 and repeater 2 to configure a pair of repeaters opposing each other, and each portion in FIG. 9 is schematically shown as in FIG. 10.

In FIG. 11, when a transmission line failure is restored (step S1), an OSC signal transmitted from repeater 1 is input to OSC portion 'a' in repeater 2. At this time, however, because Raman excitation light source 105 is not active, OSC signal light does not reach in a dynamic range of the OSC reception module in such a case of long distance transmission as the transmission system requiring the use of Raman light.

Normally, in this case, the OSC signal level does not reach area-A shown in FIG. 7, which is out of the dynamic range. Thus an occurrence of a code error is detected in OSC reception module 102 (refer to FIG. 9) in OSC portion 'a' in FIG. 11.

When a code error is identified in OSC reception module 102, OSC terminator 106 (refer to FIG. 9) in OSC portion 'a' in FIG. 11 sets an APSD flag for OSC code error. Then, from OSC portion 'b' shown in FIG. 11, the APSD flag is transmitted to repeater 1 through transmission line 31-1 (step S2).

Moreover, on receiving APSD flag from OSC reception portion 'a' in repeater 2, Raman excitation light source 105 emits light having gains in the OSC signal bandwidth (step S3).

Here, optical amplification unit 104-2 on the repeater 1 side, although remaining to suspend light output, shifts to a standby state in which OSC line restoration is awaited (step S4).

Through the operation described as step S3 above, the condition is restored to area-A in FIG. 7 in which Raman gain sufficient for OSC signal for normal operation is generated. This enables OSC reception portion 'a' to receive OSC signal normally, as shown in FIG. 12 (step S5), to transmit APSD flag to OSC portion 'c' in repeater 1 through OSC portion 'b' in repeater 2 (step S6).

On restoration of normal OSC line operation, Raman excitation light source 105 outputs Raman light producing Raman gain in a required wavelength according to the multi-wavelength information provided in the system (step S7).

Furthermore, optical amplification unit 104-1 in repeater 2, after receiving a normal OSC signal and identifying an APSD flag, is put into a normally initiated state, waiting for receiving inputs (step S8).

On receiving the APSD flag in normal OSC reception, OSC reception portion 'c' on the repeater 1 side enters a normal startup sequence to remove the output control of optical amplification unit 104-2 (step S9).

Through the aforementioned operation, the system enters automatic startup operation to restore normal operation when optical fiber transmission line 30 is restored.

[Continuing Communication on the Opposite Line in Case of Line Failure]

When such a transmission line failure occurs as previously shown in FIG. 10, it is necessary to shut down the output of optical amplification unit 204-2 in repeater 2 when only the APSD function is applied for the output control of the optical amplifier.

The reason is that, in case the OSC line from repeater 1 to repeater 2 is disconnected because of a transmission failure etc., if an additional failure occurs on transmission line 31-1 from repeater 2 to repeater 1, an APSD signal indicating a fault in repeater 2 cannot be transmitted to optical amplification unit 204-2.

In this case, when an optical connector connected to optical amplification unit 204-2 in repeater 2 is extracted manually, output light of optical amplification unit 204-2 is radiated from the end of the connector, bringing about a possible injury to the human body.

To prevent this injury to the human body, a function is provided on the optical amplification unit 204-2 side for detecting reflection of light output. Such duplicated functional provisions of the APSD and the reflection light detection enable to continue communication from repeater 2 to repeater 1.

Referring to FIG. 10, occurrence of a code error, frame error, OSC signal break is supervised in OSC reception portion 'a'. When a bit error or frame error continues, output power of Raman excitation light source 105 is raised to a specified design value, while light output is shut down when an optical input is interrupted. Thus an automatic startup becomes possible when the transmission line failure is restored.

[APSD Flag]

Here, further description on the APSD flag follows hereafter. The APSD flag is generated in OSC terminators 106 and 206 after a light OSC signal received on OSC reception modules 102 and 202 shown in FIG. 9 is converted into electric signal.

In OSC terminators 106 and 206, a code error, frame error and OSC signal interruption are supervised based on a data, DATA, and a clock, CLK identified and regenerated in OSC reception modules 102 and 202. The APSD flag is a flag signal to inform of the occurrence of the code error, frame error or OSC signal interruption detected by the supervision.

A data in the APSD flag on an OSC signal is informed to each portion constituting the system. The OSC signal enables to determine which relay point the line is disconnected, using identification information ID of APSD generation equipment or other method.

[Connector Disconnection Detection (LD SAFETY)]

Figure 13:
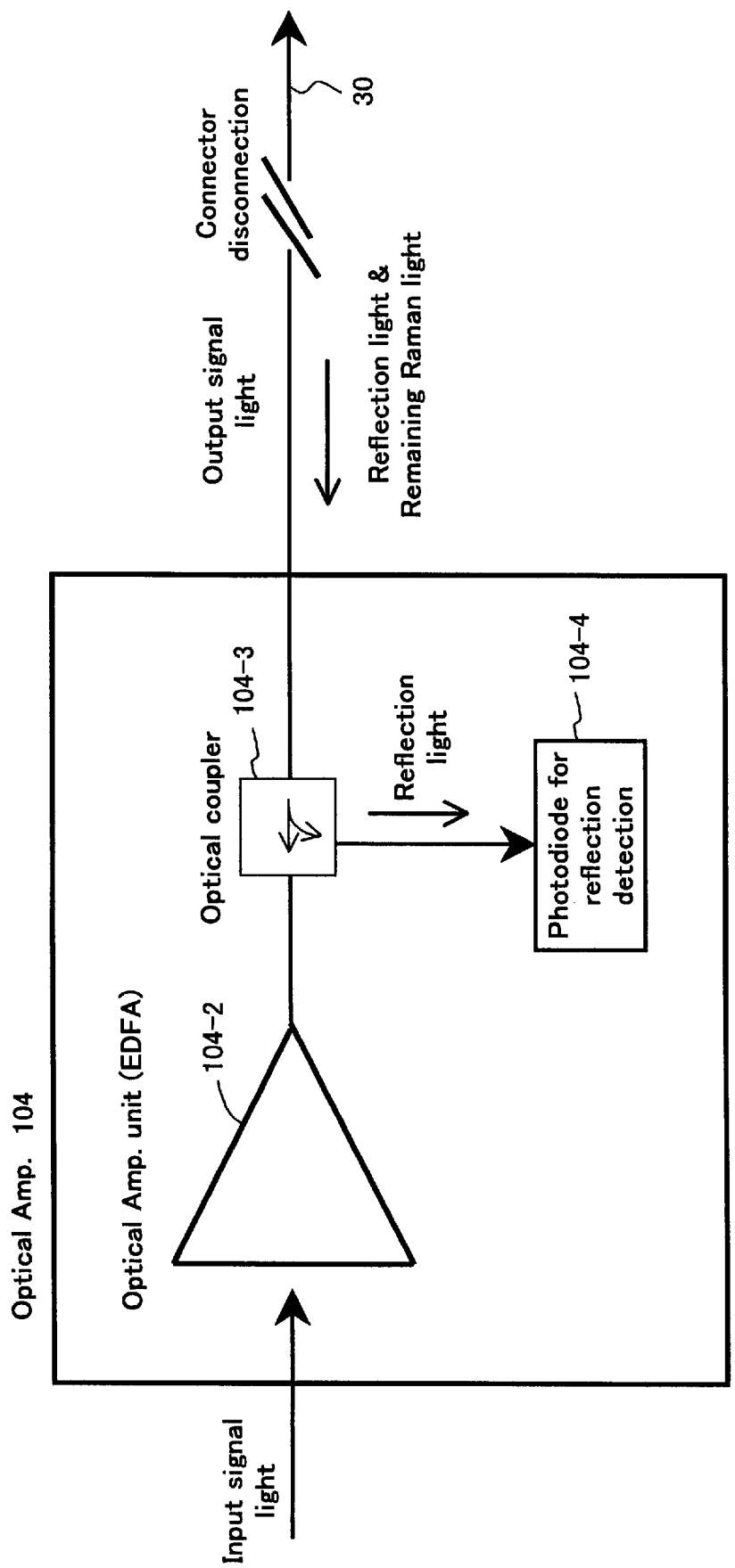
FIG. 13 shows a method for detecting a connector disconnection (LD SAFETY).

Now, an example of a method for detecting connector disconnection ('LD SAFETY' function) mentioned before is shown in FIG. 13. In this figure, light signal optically-amplified by an optical amplifier (EDFA: Erbium-doped fiber amplifier) corresponding to optical amplification unit 104-2 in repeater 1 is output to transmission line 30 through optical coupler 104-3.

On the output side of optical amplification unit 104-2, there are provided a photodiode (PD) 104-4 for detecting light reflection and an optical coupler 104-3.

In case a connector for connecting optical amplifier 104 and transmission line 3 is omitted, a reflection component of the optical signal output from optical amplifier 104 is detected by photodiode for reflection detection 104-4, enabling to detect the optical connector disconnection.

By detecting the reflection light in case of the disconnection of the optical connector, the output of a non-illustrated optical amplification unit 104-2 can be controlled to light output level not to harm the human body (safety light level) realizing the 'OLD SAFETY' function.

However, by the aforementioned connector disconnection detection method, the connector disconnection occurring in the downstream of the line concerned cannot be detected when an OSC line is disconnected caused by a failure on the transmission line fiber of the opposite direction. This results in continuing to output the light level which possibly harms the human body. As this is very dangerous, it is desirable to realize the aforementioned LD SAFETY function by means of the reflection detection of the line concerned.

As shown in FIGS. 14 to 17, in case a communication system is constituted by terminal stations (station-A 1 and station-C 4) and repeater 2, an in-line amplifier 104-5 is applied for optical amplification unit 104 in repeater 2. In this repeater 2, optical amplification of main signal light and regeneration transmission of OSC signal light are carried out. The OSC system can be configured in two ways in view of OSC line termination; a 'multi-stage OSC relay system' sectioned on a transmission direction basis; and an 'OSC loop-back system', sectioned on a stage-by-stage basis.

Figure 14:
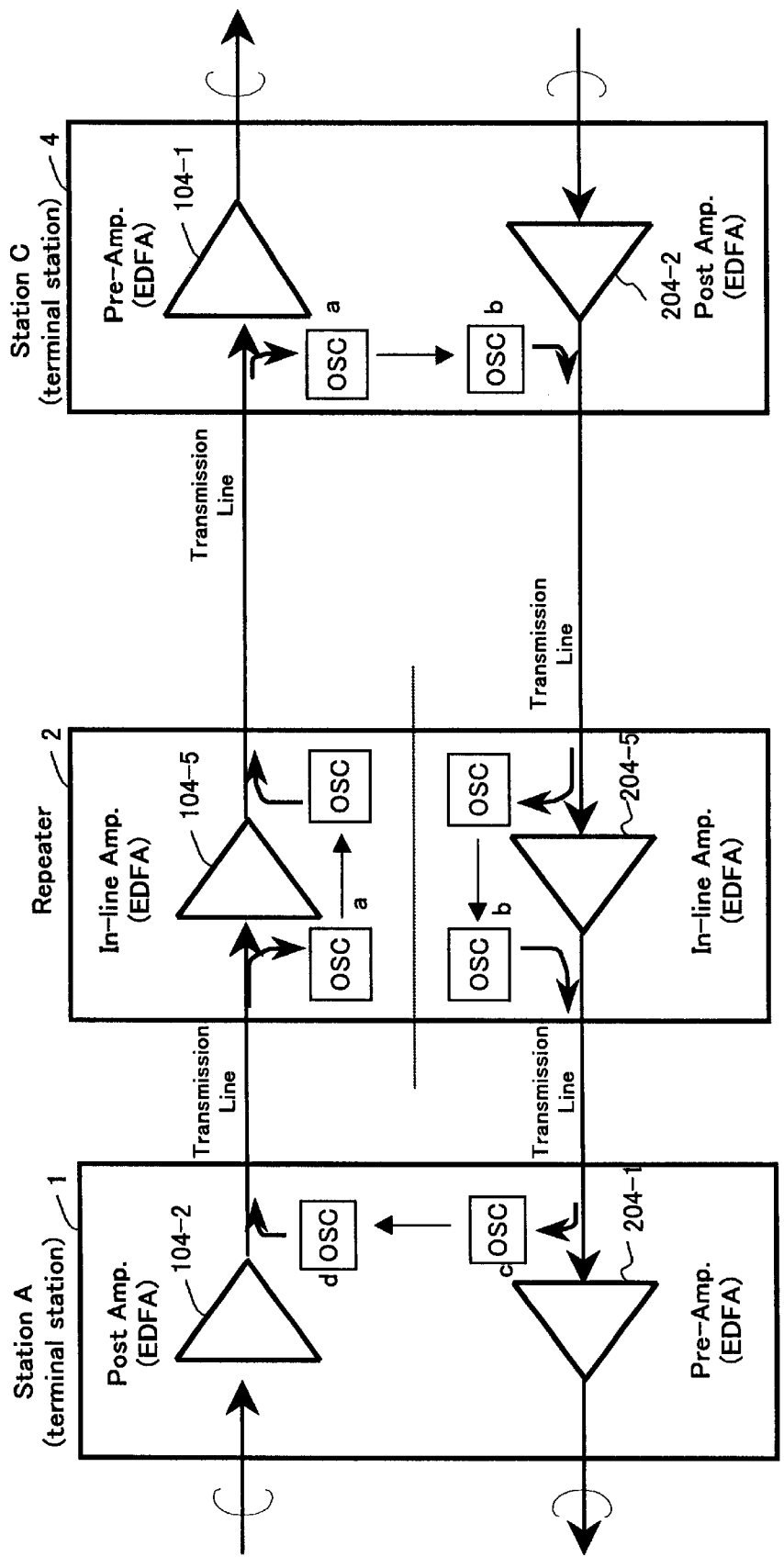
FIG. 14 shows a configuration of multi-stage OSC relay system (sectioned on transmission direction basis) as an application of the present invention.
Figure 15:
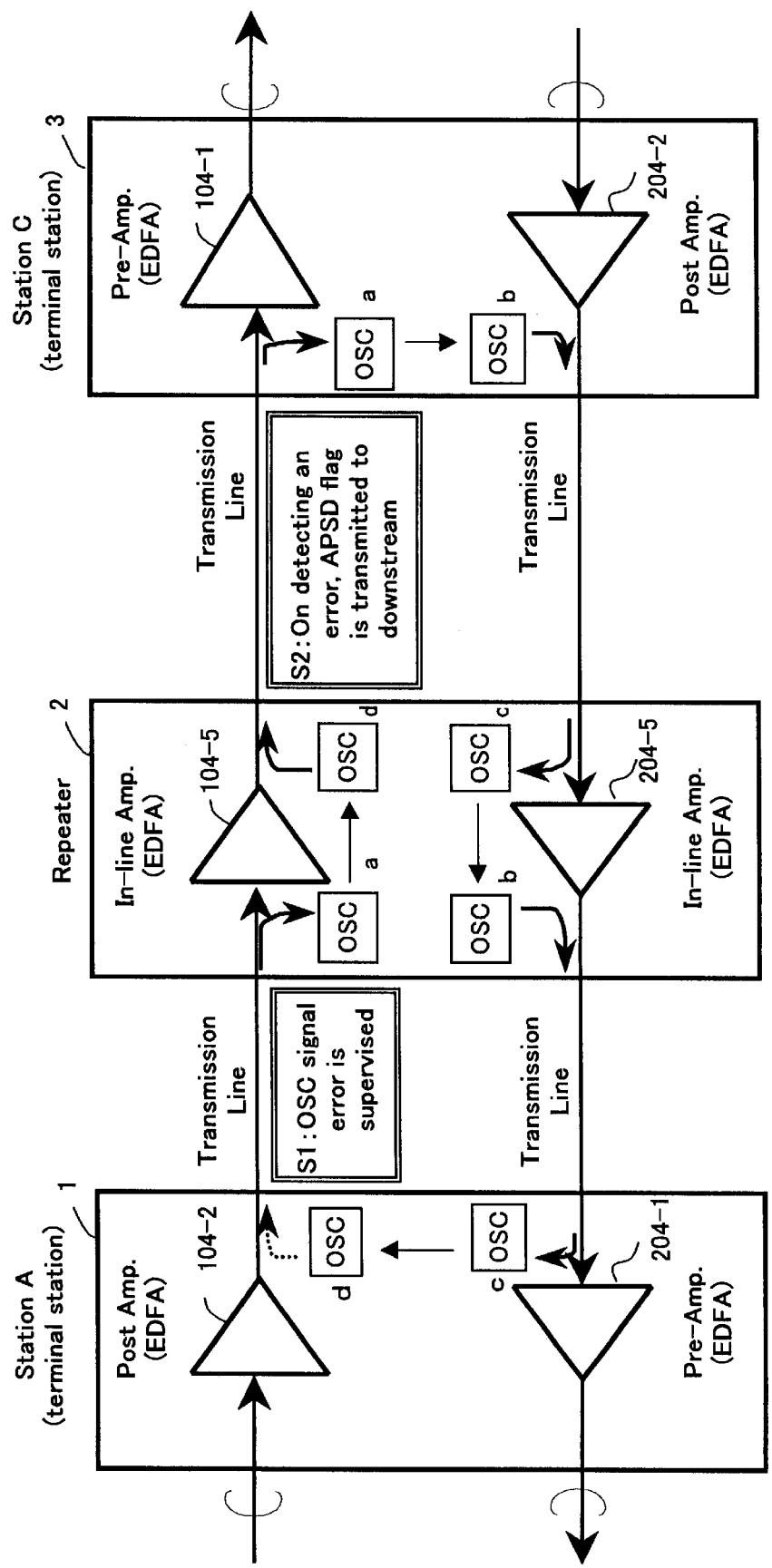
FIG. 15 shows a diagram illustrating an operation in the event of a failure shown in FIG. 11.

In FIG. 14, as an application example of the present invention, a configuration of the multi-stage OSC relay system is shown. In FIG. 15, there is illustrated an operation of the system shown in FIG. 14 in case a failure occurs.

Here, in the multi-stage OSC relay system such a method that, in repeater 2, information related to repeater 2 is added to the information extracted from the OSC signal received from upstream and terminated by the OSC reception portion 'a', then is retransmitted to downstream from the transmission OSC portion 'd'.

In FIG. 15, an operation chart in case of a failure is shown. An OSC signal error is supervised in OSC reception portion 'a' in repeater 2 (step S1). On occurrence of an error, an APSD flag is set in the OSC signal to transfer downstream from transmission OSC portion 'd'.

Here, as shown in FIG. 15, an OSC signal is not transmitted from repeater 2 back to station-A 1 which is located upstream.

Thus OSC signal processing in repeater 2 becomes simple. However, demand is increasing in recent years to a so-called photonic network where processing is carried out on light signal bases. Considering such situation that add/drop is performed using light signals, the system configuration shown in FIG. 11 is not sufficiently flexible.

Figure 16:
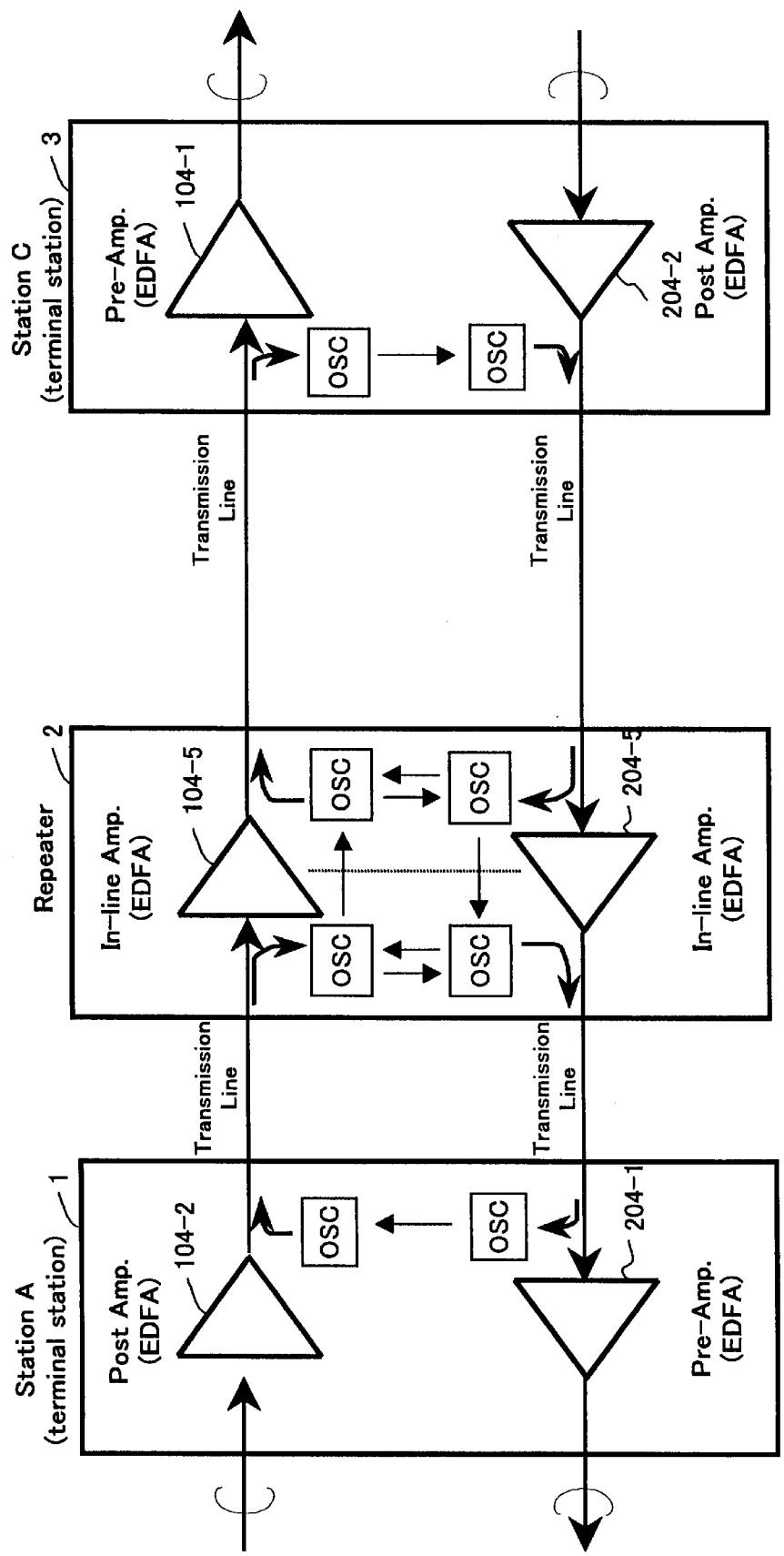
FIG. 16 shows a configuration of OSC loop-back system (sectioned on transmission stage-by-stage basis) as an application of the present invention.

On the other hand, in FIG. 16, there is shown a system configuration in which the 'OSC loop-back system' sectioned on a stage-by-stage basis is applied. As shown in the figure, an OSC signal received from upstream is terminated in each repeater. In this method an OSC signal is transmitted back to the upstream optical multiplexing equipment with information on the repeater concerned attached, without the intervention of the downstream optical multiplexing equipment.

Figure 17:
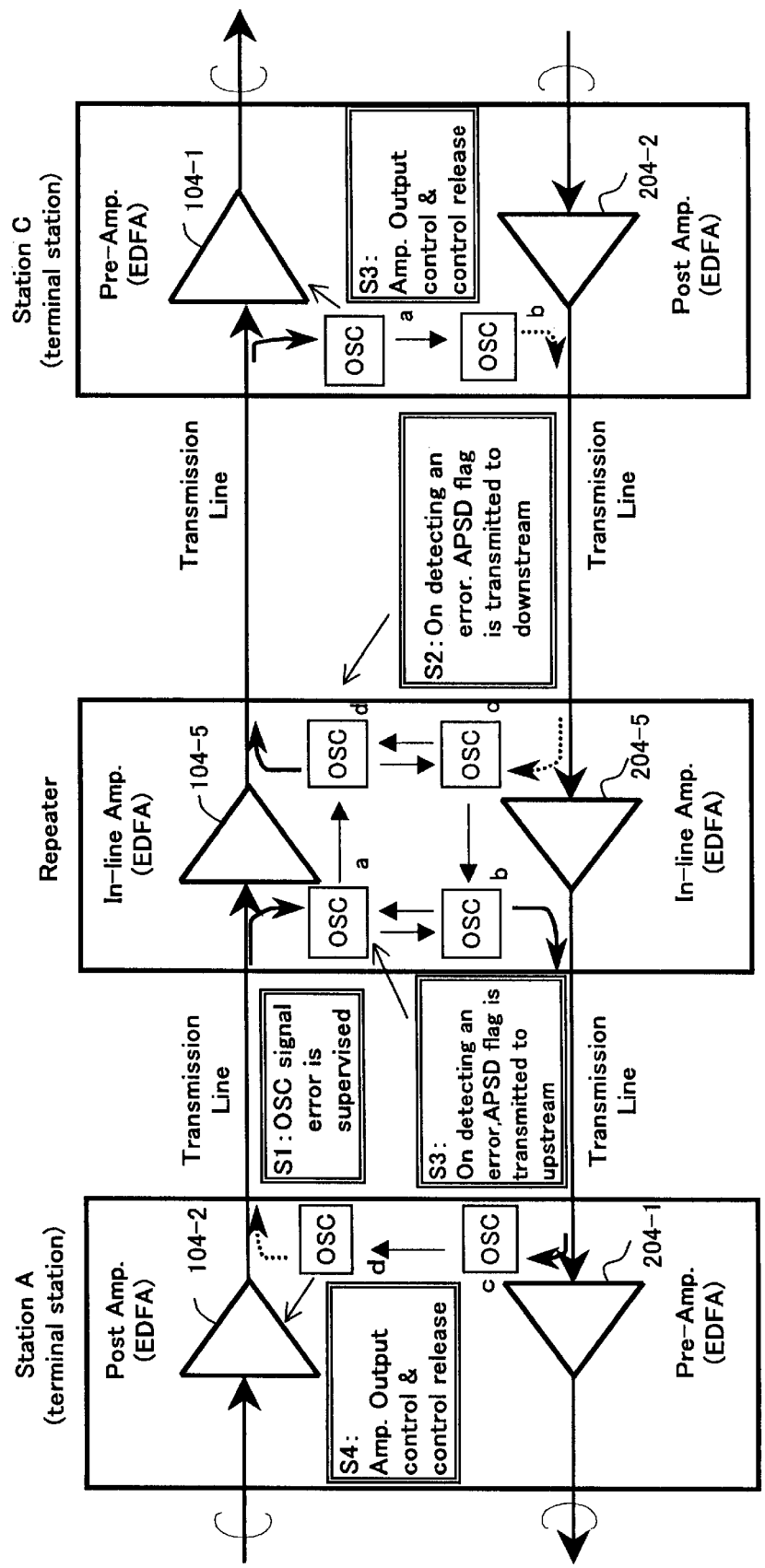
FIG. 17 shows a diagram illustrating an operation in the event of a failure shown in FIG. 13.

In FIG. 17, an operation chart in case of a failure in FIG. 15 is shown. An error in the OSC signal is supervised by OSC reception portion 'a' in repeater 2 (step S1). On detecting an error, an APSD flag is set to transmit an APSD flag from transmission OSC portion 'd' to downstream by mean of the OSC signal (step S2), which is similar to the aforementioned multi-stage OSC relay system.

At the same time, however, the identical APSD flag is transferred from transmission OSC portion 'b' of the opposite line in repeater 2 back to repeater 1 located upstream by means of an OSC signal (step S3). Thus, in repeater 1, an output of a post amplifier 104-2 can be controlled based on the APSD flag.

In a communication system using such a stage-by-stage OSC loop-back method, it is possible to reduce the suspension of the system operation minimally caused by an OSC line failure on the other section. Furthermore, this method makes it easy to localize the faulty point and identify the faulty condition, which facilitates a prompt recovery from the failure.

[OSC Communication Using Separate Transmission Wavelengths of C-band and L-band]

Figure 18:
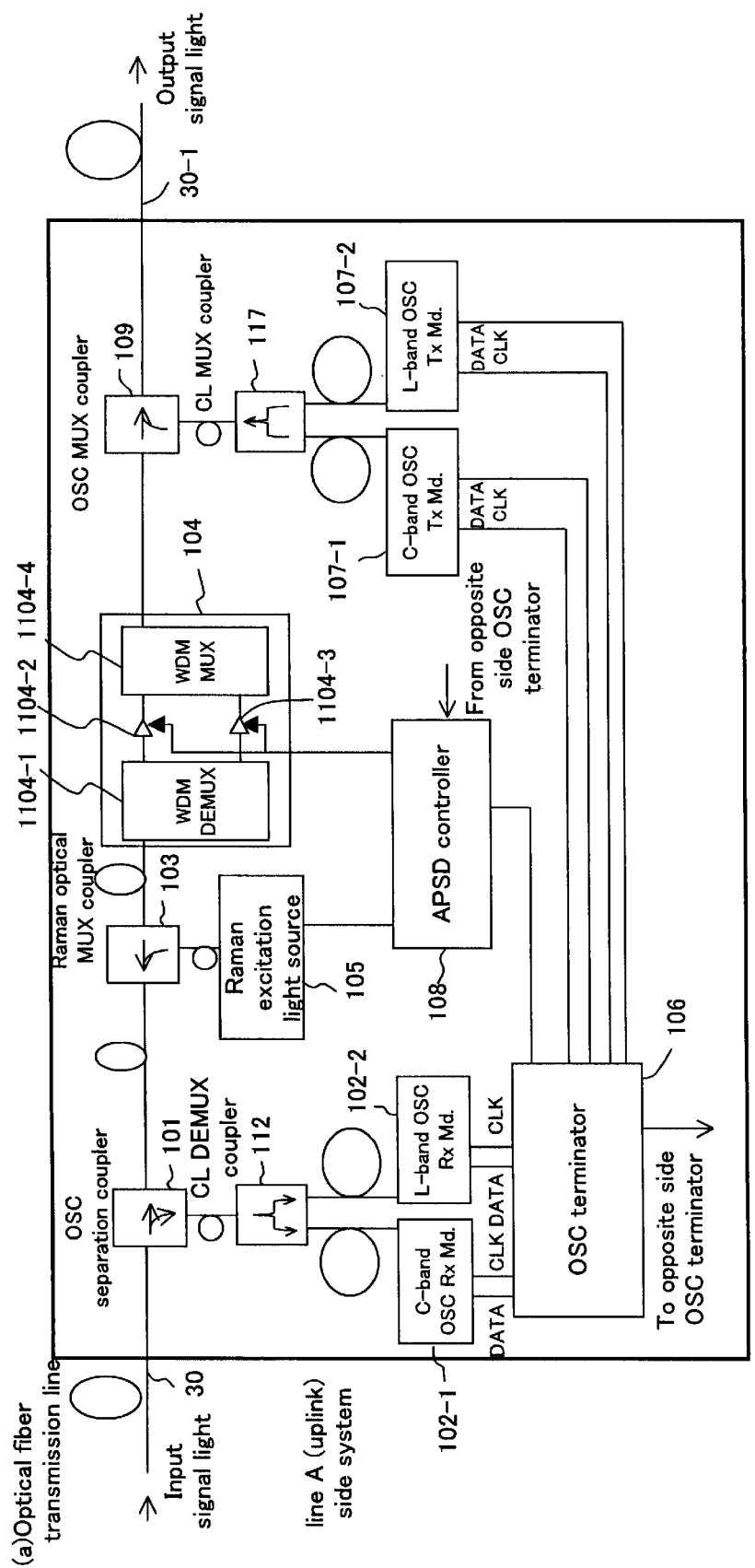
FIG. 18 shows a block diagram of optical multiplexing communication equipment with separated bandwidths of C and L bands as another application example of the present invention.
Figure 19:
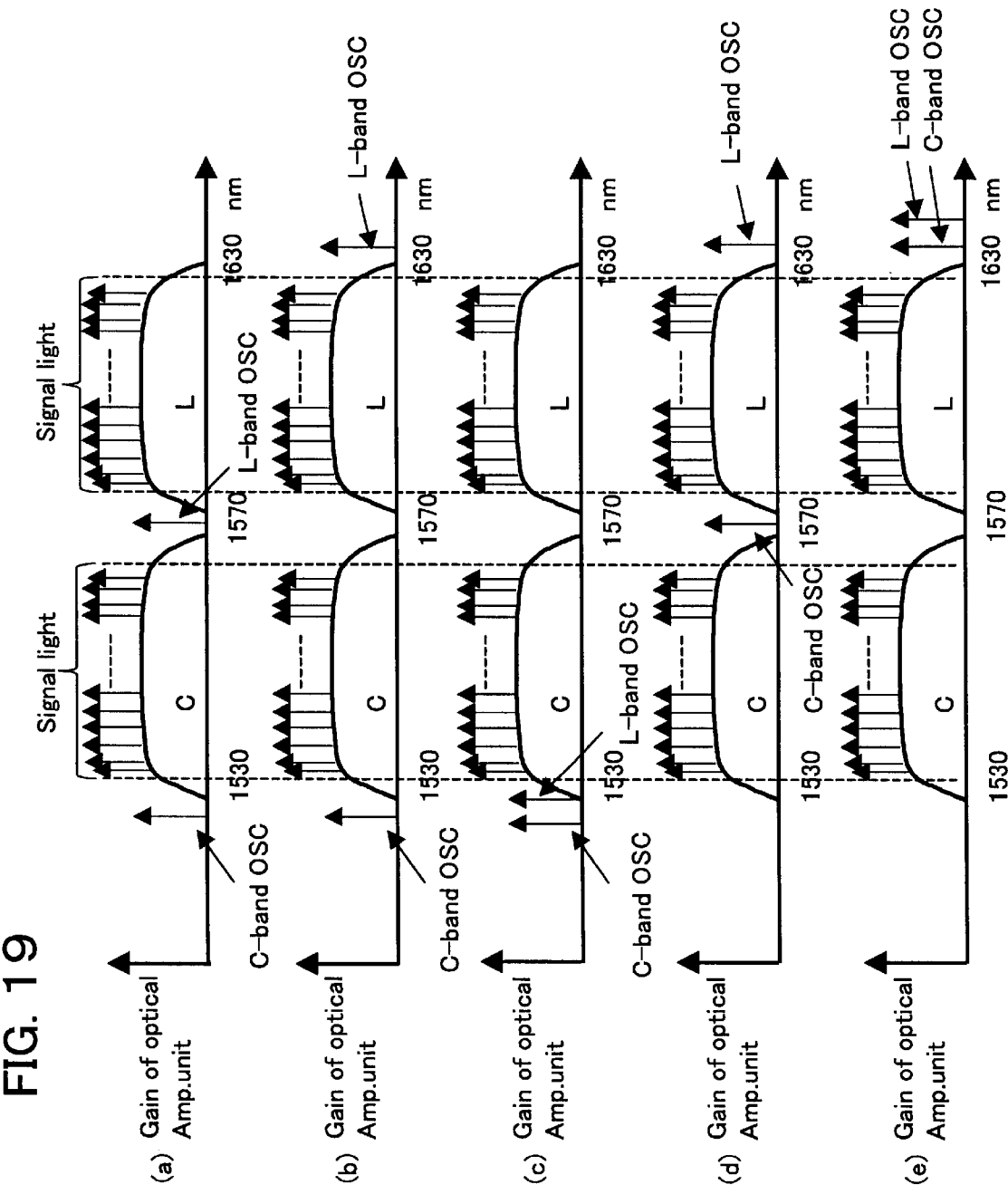
FIG. 19 shows a diagram illustrating the relation between an OSC signal for each band and an optical transmission signal.

In FIG. 18, there is show another embodiment example of the present invention, in which a block diagram of an optical amplifier with a separated wavelengths of C-band and L-band.

An EDFA, an optical amplifier currently used, produces gain in the bandwidths of C band (of which wavelength is 1530 nm to 1550 nm) and L band (of which wavelength is 1570 nm to 1610 nm). Under current situation of ongoing abrupt increase in communication traffic, wavelength multiplexing of more than 80 waves for each C band and L band is required. In addition, transmission speed per each wave exceeds 10 G bps. Such situation necessitates a system configuration more complex as well as flexible.

In order to meet above-mentioned requirement, OSC signal has to carry more amount of information because information such as the number of wavelengths and transmission/reception conditions of optical multiplexing communication equipment is interchanged between each equipment using OSC signal.

On the other hand, in order to perform communication using an OSC line in such long distance transmission without intervening optical amplifier as required for current optical multiplexing communication equipment, a wade dynamic range is required. It is, however, difficult to provide optical transmission/reception modules with high speed transmission capability and, at the same time, a wide dynamic range.

Therefore, as a feature of the present invention, multiwavelength OSC signal is introduced to realize high density, high speed optical multiplexing transmission. In FIG. 18, there is shown an embodiment of optical multiplexing transmission equipment having this feature. In this figure, there is illustrated a related part on the line-A side of system I in optical multiplexing transmission equipment shown in FIG. 9.

The difference from the identical portion in FIG. 9 is that OSC reception module 102 is replaced by a C-band OSC reception module 102-1 and an L-band OSC reception module 102-2, and also OSC transmission module 107 is replaced by C-band OSC transmission module 107-1 and an L-band OSC transmission module 107-2, thus constituting two subsystems for interchanging OSC signals.

Moreover, OSC terminator 106 is so configured as to process two subsystems for C-band and L-band, respectively. On the rear side of OSC separation coupler 101, and on the front side of OSC multiplexing coupler 109, a CL demultiplexing coupler 112 and a CL multiplexing coupler 117 are respectively provided for demultiplexing/multiplexing light of C-band and L-band.

Optical amplification unit 104 is constituted by a wavelength separation coupler 1104-1, a C-band EDFA 1104-2, an L-band EDFA 1104-3 and wavelength multiplexing coupler 1104-4.

In C-band EDFA 1104-2 and L-band EDFA 1104-3, gain adjustment control is carried out based on OSC information in each band.

The OSC signal wavelength in each band is allocated so that the gain of optical amplification unit to be produced in an optical signal for transmission is not produced for the OSC signal.

Figure 20:
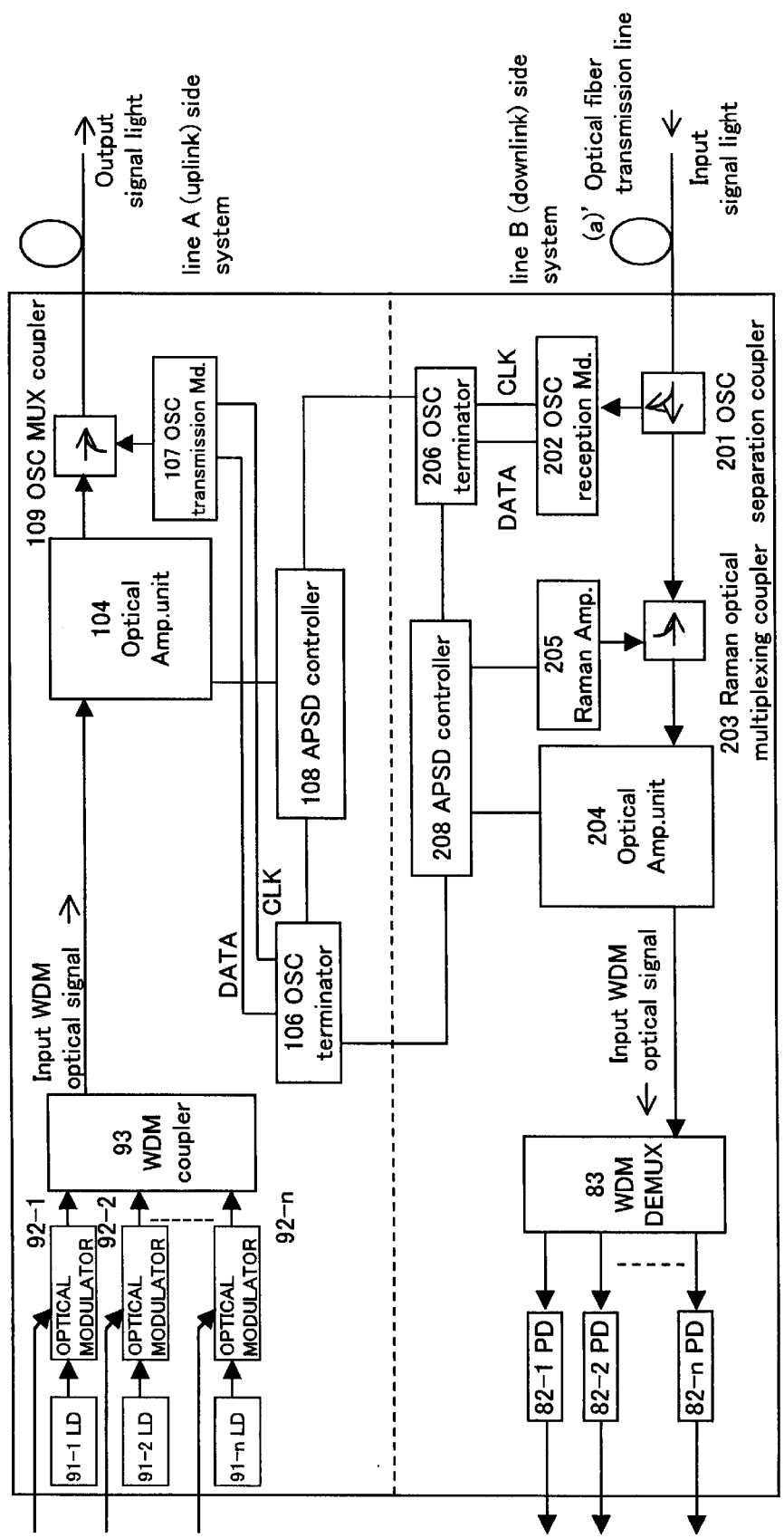
FIG. 20 shows a configuration block diagram of a typical terminal station shown in FIGS. 14 to 17.

In FIG. 20, there is shown a configuration block diagram of a typical terminal station shown in FIGS. 14 to 17. In FIG. 20 and FIG. 9, like numerals refer to like parts. As additional functional portions, there are provided lasers 91-1 to 91-n, optical modulators 92-1 to 92-n, a wavelength multiplexing coupler 93, reception modules 82-1 to 82-n, and a demultiplexer 83.

On the transmission side, outputs from lasers 91-1 to 91-n respectively having different wavelengths are modulated in optical modulators 92-1 to 92-n to be wavelength-multiplexed in wavelength multiplexing coupler 93, then being input to optical amplification unit 104.

On the reception side, output from optical amplification unit 204 is wavelength-demultiplexed by demultiplexer 83, then being demodulated into electric signal in reception modules 82-1 to 82-n.

It must be noted that, for example, such configurations of optical amplification units 104 and 204 as shown in FIG. 9 and FIG. 20 are not limited to an optical amplification unit having a single wavelength bandwidth. It may also be possible to provide with an optical amplification unit consisting of a plurality of optical amplifiers correspondingly provided for amplifying optical signals in each wavelength-divided bandwidth, such as an optical amplification unit 104 shown in FIG. 18.

Having been described the embodiments of the present invention, the following advantage may be obtained by applying code detection function for controlling the output of Raman excitation light sources and optical amplifiers.

(1) An OSC line is not disconnected even in case a transmission line failure such as a connector disconnection occurs in a main signal system. Therefore overall system operation may be recognized easily and remotely.

(2) Compared to an optical amplifier, an OSC module has high reliability obtained from the reduced number of parts as well as the simple structure. Therefore easy recognition of overall system operation is also possible by means of a remote operation even in case the optical amplifier becomes faulty to produce break in a main signal.

(3) Automatic restart of the system is possible when the transmission line failure is restored.

(4) As a result of providing both APSD and the reflection detection function, operation of the line concerned may be continued if a failure occurs on the opposite line.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. An optical amplifier using Raman amplification, comprising:
   a Raman excitation light source generating Raman light;
   a detection circuit detecting a code error, a frame error, and an optical supervisory channel (OSC) signal break on an OSC signal being transferred, in addition to an optical transmission signal; and
   a controller increasing Raman light output power of a Raman excitation light source to a predetermined level when the code error and the frame error are detected by said detection circuit, and shutting down the Raman light output power at the OSC signal break.

2. The optical amplifier according to claim 1, further comprising:
   a circuit for indicating a transmission line failure to a downstream optical amplifier by means of a flag superposed onto the optical supervisory channel (OSC) signal, which indicates an optical supervisory channel condition, when the errors detected by said detection circuit become a predetermined condition.

3. The optical amplifier according to claim 1, further comprising:
   a light-output control circuit for supervising a flag, which indicates the optical supervisory channel (OSC) condition in each OSC signal received from an upstream transmission line concerned and from an upstream transmission line in the opposite direction to perform light output control.

4. The optical amplifier according to claim 3, wherein said light-output control circuit controls to adjust light output power of the Raman excitation light source down to a level not dangerous to the human body.

5. The optical amplifier according to claim 3, wherein said light-output control circuit controls the Raman excitation light source to completely cut off the light output power.

6. The optical amplifier according to claim 3, wherein said light-output control circuit supervises the errors on the optical supervisory channel (OSC) signal, and removes the light output control against the Raman excitation light source, when said errors are restored to a predetermined condition.

7. The optical amplifier according to claim 3, wherein said light-output control circuit removes the light output control against the Raman excitation light source depending on the flag indicated in said optical supervisory channel (OSC) signal.

8. An optical amplifier using Raman amplification, comprising:
   a Raman excitation light source generating Raman light;
   a detection circuit detecting errors on an optical supervisory channel (OSC) signal being transferred, in addition to an optical transmission signal;
   a controller controlling Raman light output power of the Raman excitation light source according to the errors detected by said detection circuit; and
   a light-output control circuit supervising a flag, which indicates an OSC condition in each OSC signal received from an upstream transmission line and from an upstream transmission line in the opposite direction to perform light output control,
   wherein said light-output control circuit supervises the errors on the OSC signal, and removes the light output control against the Raman excitation light source when said errors are restored to a predetermined condition, and
   wherein, when Raman light output control against said Raman excitation light source is removed, said light-output control circuit outputs to an optical fiber transmission line, Raman light producing Raman gain corresponding to a bandwidth of said OSC signal, awaits OSC line restoration, and outputs Raman light after said OSC signal is restored normally, to produce Raman gain in a wavelength required according to wavelength information indicated through said OSC line to remove said optical amplifier light output control.

9. The optical amplifier according to claim 8,
wherein, after said OSC signal is terminated at the equipment concerned, a flag indicating a condition of said optical supervisory channel (OSC) is transmitted back to upstream using an OSC signal through the opposite line.

10. The optical amplifier according to claim 9,
wherein said optical supervisory channel (OSC) signal is transmitted through a line having independent wavelengths in C-band and L-band.

11. An optical multiplexing transmission system having a plurality of optical amplifiers interconnected with multi-state cascade connections, each of the plurality of optical amplifiers comprising:

an optical amplifier amplifying light received from a transmission line;

a Raman excitation light source exciting the transmission line;

an error detection circuit detecting a code error, a frame error, and an optical supervisory channel (OSC) signal break on an OSC signal transmitted from upper stream of said optical amplifier;

a controlling circuit increasing Raman light output power produced in said Raman excitation light source to a predetermined level when said detection circuit detects the code error and the frame error in said OSC signal, and shutting down the Raman light output power at the OSC signal break; and a circuit transmitting a flag downstream indicating said OSC signal condition from said optical amplifier.

12. The optical multiplexing transmission system according to claim 11 further comprising two lines consisting of an uplink and a downlink,
wherein each of the plurality of optical amplifiers terminates said optical supervisory channel (OSC) signal, and includes a circuit for transmitting a flag indicating an OSC line condition back to upstream through a line in the opposite direction.

* * * * *